US012580443B2

(12) United States Patent
Kim et al.

(10) Patent No.: US 12,580,443 B2
(45) Date of Patent: Mar. 17, 2026

(54) FAN MOTOR COOLING

(71) Applicant: LG ELECTRONICS INC., Seoul (KR)

(72) Inventors: Sunho Kim, Seoul (KR); Taekyung Kim, Seoul (KR); Giyeob Yang, Seoul (KR); Jounyoung Kim, Seoul (KR); Seongho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 18/673,542

(22) Filed: May 24, 2024

(65) Prior Publication Data

US 2025/0158476 A1 May 15, 2025

(30) Foreign Application Priority Data

Nov. 14, 2023 (KR) ......................... 10-2023-0157490

(51) Int. Cl.
| *H02K 5/20* | (2006.01) |
| *F04D 25/06* | (2006.01) |
(Continued)

(52) U.S. Cl.
CPC ............... *H02K 5/20* (2013.01); *F04D 25/06* (2013.01); *F04D 25/082* (2013.01);
(Continued)

(58) Field of Classification Search
CPC ............ H02K 5/20; H02K 1/16; H02K 5/207; H02K 7/083; H02K 7/14; H02K 11/0094;
(Continued)

(56) References Cited

U.S. PATENT DOCUMENTS

| 10,641,282 B2 * | 5/2020 | Hayamitsu .............. F04D 25/06 |
| 2021/0143769 A1 * | 5/2021 | Fogarty, Jr. ........... F04D 29/023 |
| 2023/0021359 A1 * | 1/2023 | Hwang ............... F04D 29/4253 |

FOREIGN PATENT DOCUMENTS

| JP | 2022081862 A * | 6/2022 | ............... H02K 5/04 |
| KR | 10-2021-0153940 | 12/2021 | |
(Continued)

OTHER PUBLICATIONS

Machine translation of Japanese Patent Publication JP 2022-081862 A; 1st Inventor: Sakagami; Title: Electric Blower and Vacuum Cleaner Including the same; Published Jun. 1, 2022. (Year: 2022).*

*Primary Examiner* — Mary A Davis
(74) *Attorney, Agent, or Firm* — KED & ASSOCIATES

(57) ABSTRACT

A fan motor may include a shroud, an impeller accommodated in the shroud, a motor connected to the impeller through a rotational shaft, and a motor housing that accommodates the motor. The motor housing may include an outer wall, an inner wall, a cover that covers an upstream end of the inner wall, and at least one vane disposed between an inner circumferential surface of the outer wall and an outer circumferential surface of the inner wall. A discharge passage may be defined between the inner wall and an outer circumferential of the stator. Air in an air pocket formed by the cover, the inner wall, and an upstream end of the motor may be discharged into the discharge passage by a high flow rate of air passing through the at least one vane. Accordingly, air inside of the air pocket may be externally discharged without stagnating.

21 Claims, 12 Drawing Sheets

(51) Int. Cl.

| | |
|---|---|
| *F04D 25/08* | (2006.01) |
| *F04D 29/02* | (2006.01) |
| *F04D 29/05* | (2006.01) |
| *F04D 29/056* | (2006.01) |
| *F04D 29/40* | (2006.01) |
| *F04D 29/42* | (2006.01) |
| *H02K 1/16* | (2006.01) |
| *H02K 7/08* | (2006.01) |
| *H02K 7/14* | (2006.01) |
| *H02K 11/00* | (2016.01) |
| *H02K 11/33* | (2016.01) |

(52) U.S. Cl.
CPC ........... *F04D 29/023* (2013.01); *F04D 29/05* (2013.01); *F04D 29/056* (2013.01); *F04D 29/40* (2013.01); *F04D 29/403* (2013.01); *F04D 29/42* (2013.01); *H02K 1/16* (2013.01); *H02K 5/207* (2021.01); *H02K 7/083* (2013.01); *H02K 7/14* (2013.01); *H02K 11/0094* (2013.01); *H02K 11/33* (2016.01); *H02K 2211/03* (2013.01)

(58) Field of Classification Search
CPC ...... H02K 11/33; H02K 2211/03; H02K 9/06; F04D 25/06; F04D 25/082; F04D 29/023; F04D 29/05; F04D 29/056; F04D 29/40; F04D 29/403; F04D 29/42
See application file for complete search history.

(56) References Cited

FOREIGN PATENT DOCUMENTS

| | | | |
|---|---|---|---|
| KR | 10-2023-0072178 | 5/2023 | |
| WO | WO-2021084875 A1 * | 5/2021 | ............... H02K 9/06 |

* cited by examiner (a)                    (b)

FAN MOTOR COOLING

CROSS-REFERENCE TO RELATED APPLICATION(S)

Pursuant to 35 U.S.C. § 119(a), this application claims the benefit of the earlier filing date and the right of priority to Korean Patent Application No. 10-2023-0157490, filed in Korea on Nov. 14, 2023, the contents of which are incorporated by reference herein in their entirety.

BACKGROUND

1. Field

A fan motor is disclosed herein.

2. Background

Motors may be installed in home appliances, such as vacuum cleaners, and hair dryers, for example. A vacuum cleaner or a hair dryer may generate a rotational force using a motor as a power source.

For example, a motor may be coupled to a fan. The fan may rotate at a high speed by receiving power from the motor and generate an air flow.

A user operates a handy-stick cleaner or a hair dryer while holding it with a hand. In order to enhance the user's portability and convenience, reduction of size and weight of a cleaner or a hair drier is required.

To improve the performance of the fan, a diameter of the fan may increase or a rotational speed of the fan may increase. To improve the performance of the motor, a diameter of the motor may increase or an axial length of the motor may increase. This may increase a capacity of the motor.

Prior art patent document Korean Patent No. 10-2023-0072178 (hereinafter, referred to as "Patent Document 1"), which is hereby incorporated by reference, discloses a fan motor assembly. In the case of Patent Document 1, when an outer diameter of a flow path part (diffuser) increases while a diameter of a motor (stator) is fixed, a flow path gap increases between an outer diameter of the motor and an inner diameter of the flow path part.

However, in Patent Document 1, the flow of air that flows out of the outlet of the flow path part plays a role of an air curtain, and thereby causes a phenomenon that air inside of a motor housing to become stagnant without flowing out through the flow path gap. Due to this, Patent Document 1 has a problem in that a cooling performance of the motor is reduced.

Additionally, in Patent Document 1, a stator is accommodated inside of the motor housing in a direction close to an impeller, thereby narrowing a space between an inner surface of the motor housing and the stator. This reduces a volume of air between the motor housing and the stator which can absorb heat generated in the stator, causing a problem of deteriorating the cooling performance of the motor. Further, an area where a stator core is exposed to the outside of the motor housing is small, which causes a problem of lowering heat dissipation performance.

Prior art patent document Korean Patent No. 10-2021-0153940 (hereinafter, referred to as Patent Document 2), which is hereby incorporated by reference, discloses a motor assembly and a cleaner including the same. In the case of Patent Document 2, the motor assembly includes a heat dissipation cover that covers an outer surface of the motor.

The heat dissipation cover includes an inner cover and an outer cover. The inner cover is disposed at a spacing from the outer surface of the motor.

A cover-inner flow path through which air flows is defined by the spacing of the inner cover. The outer cover is disposed outside of the inner cover. A cover-outer flow path through which air flows is defined along an outer surface of the outer cover. With this configuration, the inner cover is disposed adjacent to the outer surface of the motor, so that external air of the housing flows into the housing along the outer surface of the motor through the spacing, thereby effectively cooling the motor. However, Patent Document 2 employs the separate heat dissipation cover for forming the cover-inner flow path and the cover-outer flow path, which causes an increase in the number of components and manufacturing costs.

BRIEF DESCRIPTION OF THE DRAWINGS

Embodiments will be described in detail with reference to the following drawings in which like reference numerals refer to like elements, and wherein:

FIG. 11A is a view of a disposition relationship between the motor housing and the stator when the phase difference is greater than 0, and FIG. 11B is a view of a disposition relationship between the motor housing and the stator when the phase difference is 0.

DETAILED DESCRIPTION

Hereinafter, a fan motor according to embodiments will be described with reference to the accompanying drawings.

In the following description, in order to clarify characteristics of the embodiments, descriptions of some components may be omitted.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

A "fan motor" used in the following description may be understood as a concept meaning a device that suctions or blows air by rotating a fan using a power source, such as an electric motor.

The term "axial direction" used in the following description means a longitudinal direction of the rotational shaft.

The term "radial direction" used in the following description means a longitudinal direction of a line segment from a center of a circle or cylinder to a point on a circumference of a circle.

The term "axial direction" used in the following description means a direction of a circumference of a circle.

Figure 1:
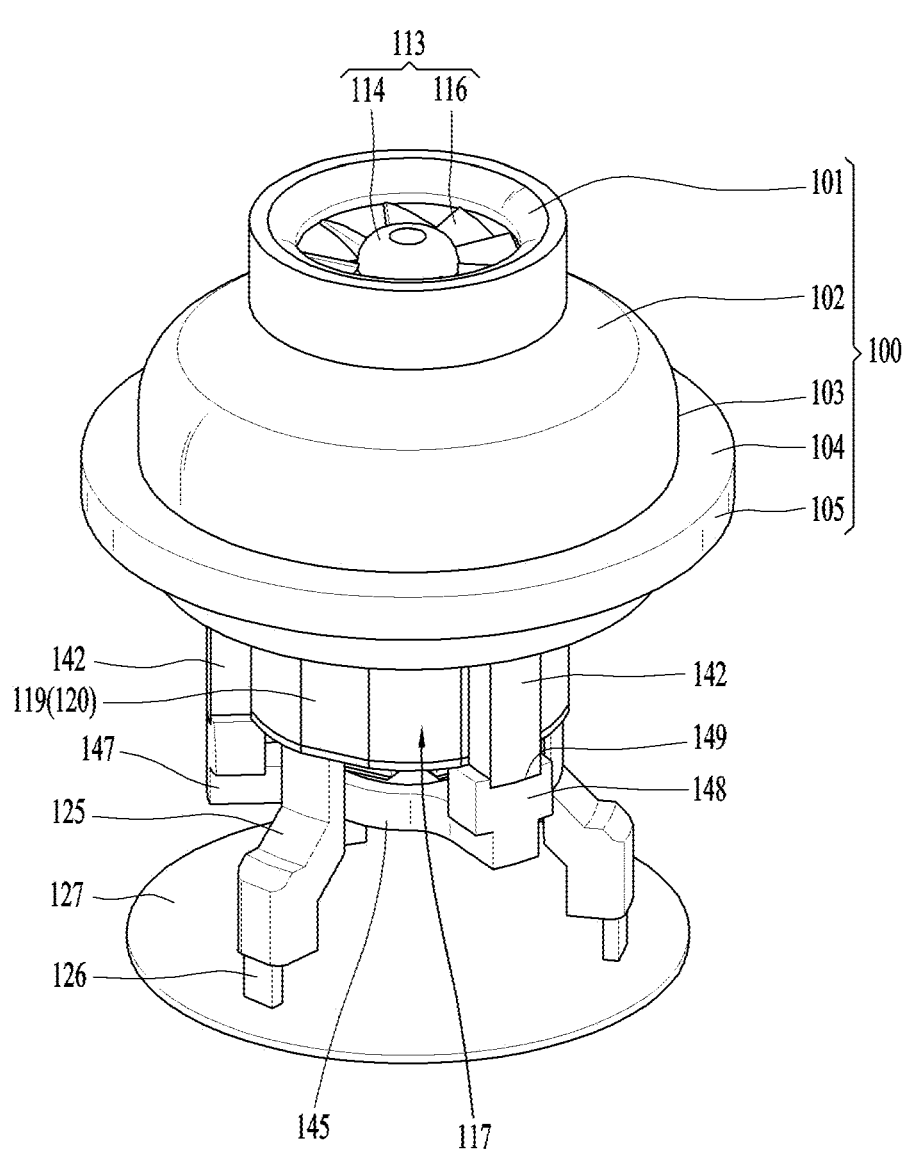
FIG. 1 is a perspective view of a fan motor according to an embodiment.
Figure 2:
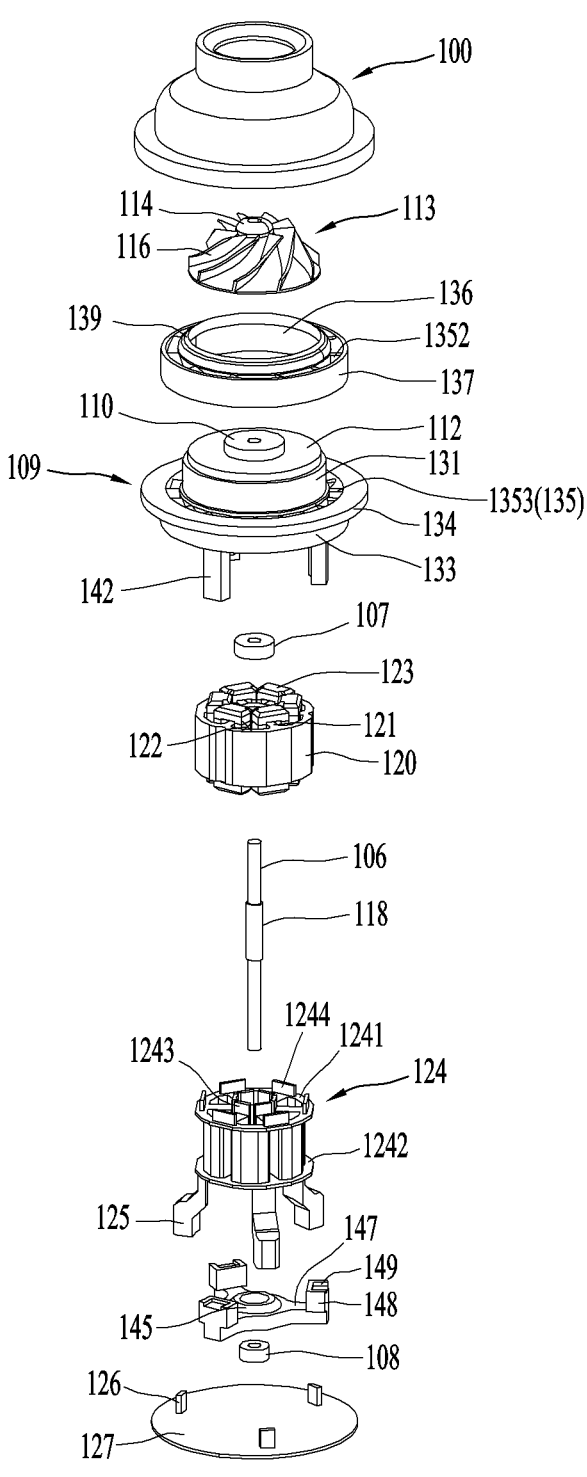
FIG. 2 is an exploded view of the fan motor in FIG. 1.
Figure 3:
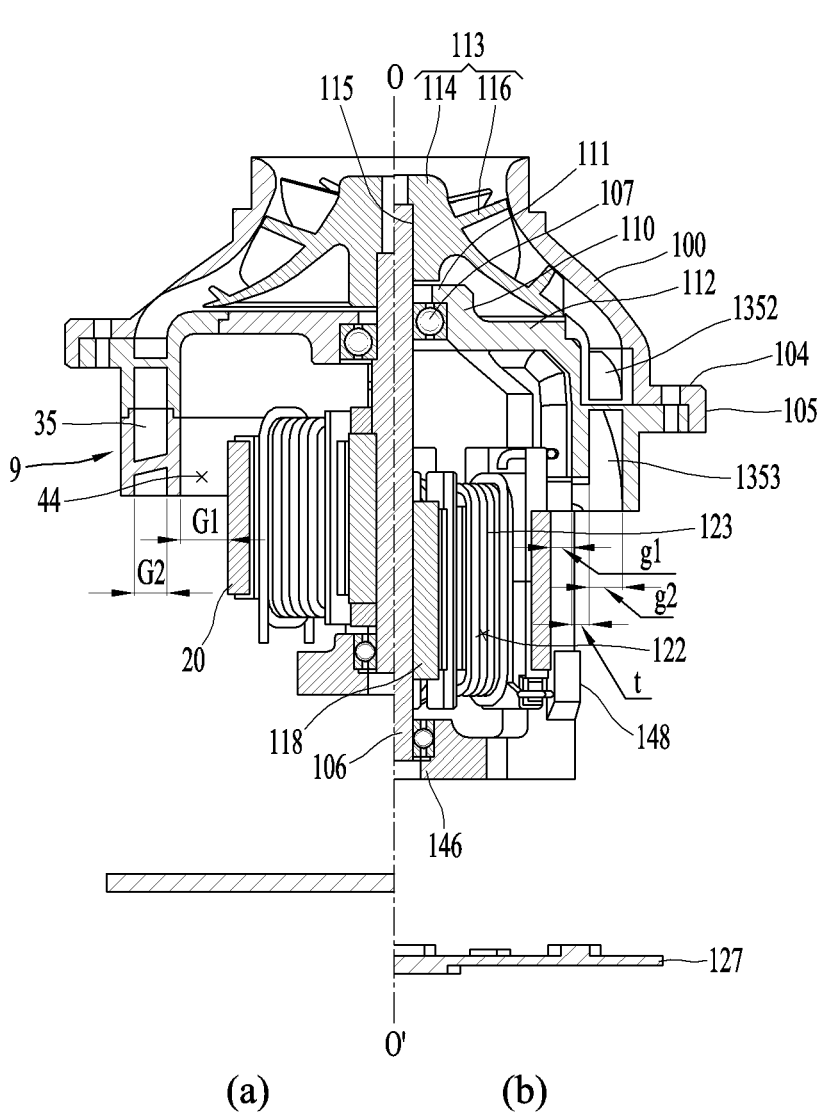
FIGS. 3(a) and (b) are cross-sectional views for explaining an internal configuration of the fan motor in FIG. 1, where (a) is a conceptual view of an initially designed fan motor, which is shown on a left side with respect to a vertical center line O-O' in FIG. 3, and (b) is a conceptual view of a configuration of the fan motor according to an embodiment, which is shown on a right side with respect to the vertical center line O-O' in FIG. 3.

FIG. 1 is a perspective view of a fan motor according to an embodiment. FIG. 2 is an exploded view of the fan motor in FIG. 1. FIG. 3 is a cross-sectional view for explaining an internal configuration of the fan motor in FIG. 1, where FIG. 3(*a*) is a conceptual view of an initially designed fan motor, which is shown on a left side with respect to a vertical center line O-O' in FIG. 3, and FIG. 3(*b*) is a conceptual view of a configuration of the fan motor according to an embodiment, which is shown on a right side with respect to the vertical center line O-O' in FIG. 3.

Figure 4:
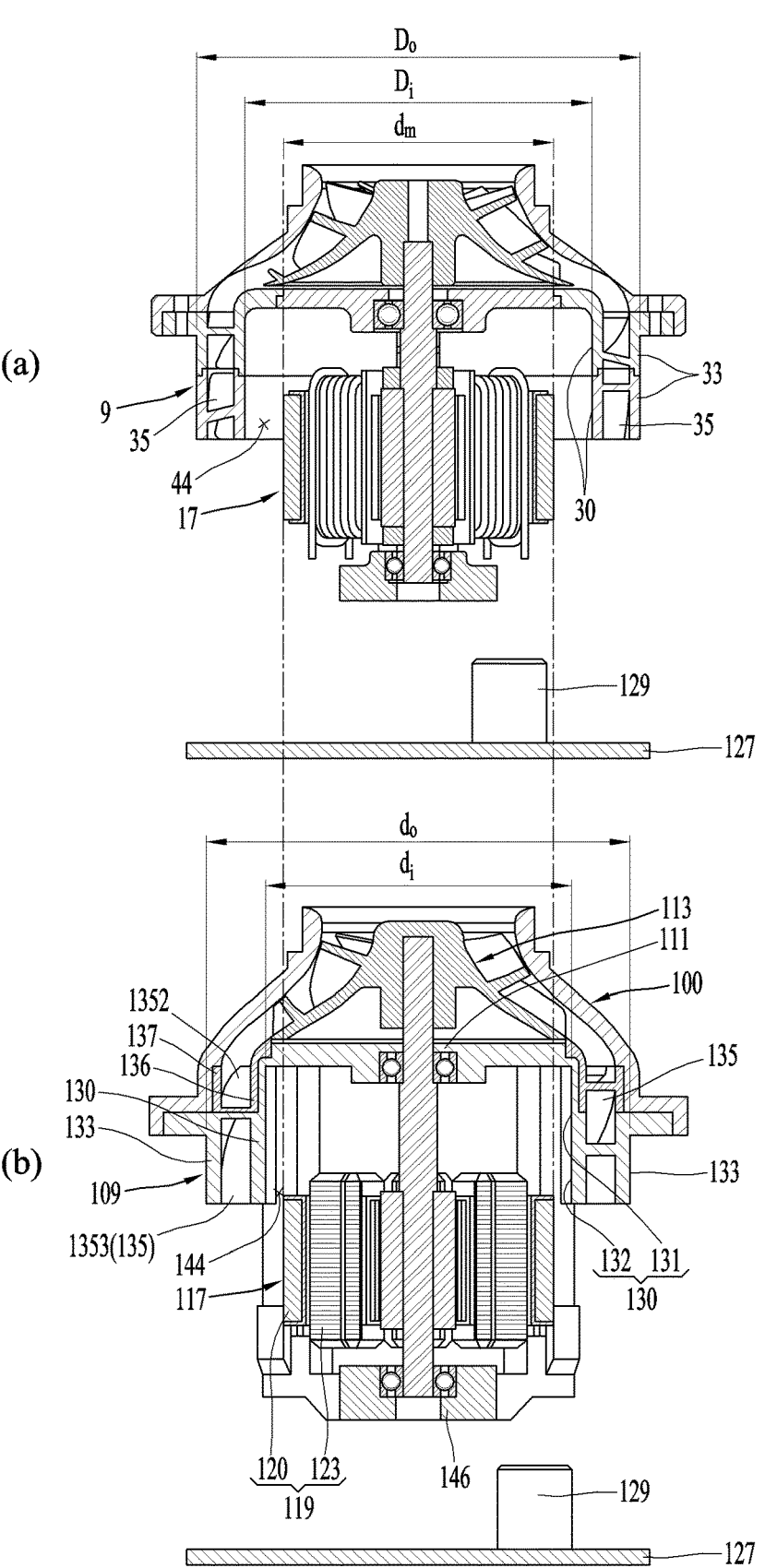
FIGS. 4(a) and (b) are cross-sectional views for explaining an internal configuration of the fan motor in FIG. 1, where (a) is a conceptual view of an initially designed state of the fan motor corresponding to FIGS. 3(a), and (b) is a conceptual view of the configuration of the fan motor according to an embodiment, corresponding to FIG. 3 (b)
Figure 5:
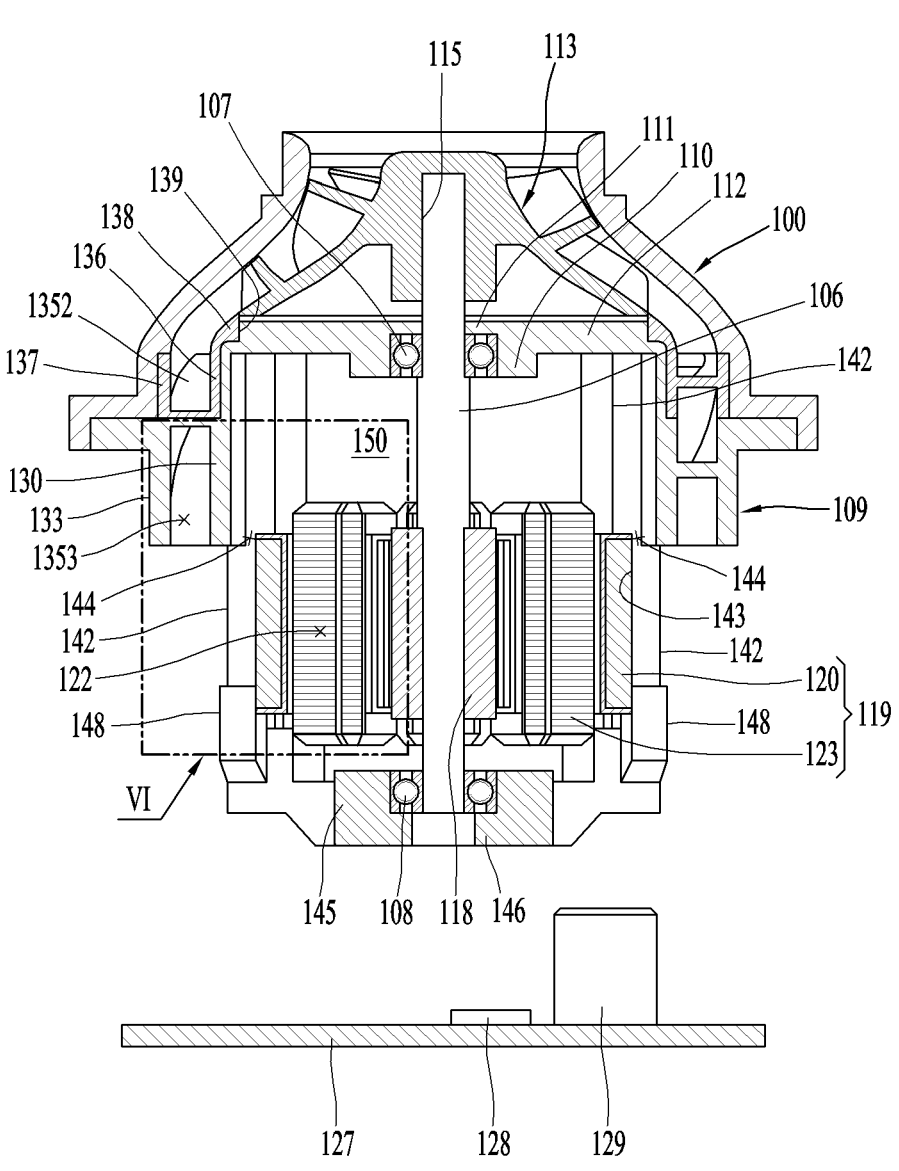
FIG. 5 is a cross-sectional view illustrating the fan motor according to an embodiment, corresponding to FIG. 4(b)

FIGS. 4(*a*)-4(*b*) are cross-sectional views for explaining the internal configuration of the fan motor in FIG. 1, where FIG. 4(*a*) is a conceptual view of an initially designed state of the fan motor corresponding to FIG. 3(*a*), and FIG. 4(*b*) is a conceptual view of the configuration of the fan motor according to an embodiment, corresponding to FIG. 3(*b*). FIG. 5 is a cross-sectional view of the fan motor according to an embodiment, corresponding to FIG. 4(*b*).

A fan motor according to embodiments may be applied to home appliances, such as a handy-stick cleaner, for example. The fan motor may mainly include a casing, an impeller 113, and a motor.

The casing may define an appearance of the fan motor. The casing may include a shroud 100, a first housing, and a second housing. The first housing may include a motor housing 109 that accommodates the motor 117 therein. The casing may be formed of a plastic material, for example.

The shroud 100 has an accommodation space in which the impeller 113 is accommodated. Additionally, the accommodation space of the shroud 100 may accommodate a portion of a vane 135, a portion of the motor housing 109, or a first bearing 107, which will be described hereinafter. Movement paths of air generated by the impeller 113 may be defined between the shroud 100 and the impeller 113, in a flow path part (flow path) described hereinafter, for example.

The shroud 100 may be formed in a cylindrical shape, for example. The shroud 100, however, may have different diameters along a longitudinal (lengthwise) direction of a cylinder.

The shroud 100 may include a suction port 101, an inclined portion 102, and a linear portion 103. The detailed components of the shroud 100 may be disposed in order from an upstream side to a downstream side of the shroud 100 based on an air flow direction. The suction port 101 is located at an upstream end portion of the shroud 100. The suction port 101 may be formed in a cylindrical shape, for example. The suction port 101 may have relatively short diameter and length, compared to other components of the shroud 100. The suction port 101 may be formed through the shroud 100 in an axial direction. One end portion of the impeller 113 may be accommodated inside of the suction port 101. With this structure, air is suctioned through the suction port 101 by rotation of the impeller 113.

The inclined portion 102 may be disposed at a downstream side of the suction port 101. The inclined portion 102 may be inclined with respect to a rotational shaft 106 so that its diameter gradually increases from the upstream side to the downstream side of the shroud 100.

The inclined portion 102 may be formed in a conic shape, for example, along a circumference of the suction port 101. The inclined portion 102 may be formed in a curved shape, for example. The inclined portion 102 may have different curvatures from the suction port 101 toward the linear portion 103 described hereinafter. One (first) portion and another (second) portion of the inclined portion 102 have different curvatures which are opposite to each other.

A reinforcement portion may be formed on or at an edge portion where the suction port 101 and the inclined portion 102 are connected. The reinforcement portion may extend in a circumferential direction. The reinforcement portion may reinforce a strength of the shroud 100 by suppressing a reduction of a thickness of the shroud 100 and increasing the thickness of the shroud 100 at the connected portion between the suction port 101 and the inclined portion 102.

The linear portion 103 may be formed in a cylindrical shape, for example. The linear portion 103 may be formed to connect the downstream end portion of the inclined portion 102 and the linear portion 103 to be described hereinafter.

The shroud 100 is coupled to the motor housing 109. For example, a portion of the shroud 100 may be coupled to cover a portion of the motor housing 109. Alternatively, a portion of the shroud 100 may be connected in contact with a portion of the motor housing 109, which will be described hereinafter, and fastened with a fastening member such as a screw.

The shroud 100 may further include a first fastening portion 104. The first fastening portion 104 may be disposed on the downstream end portion of the shroud 100. The first fastening portion 104 may be coupled to a second fastening portion 134 of the motor housing 109, which will be described hereinafter.

The first fastening portion 104 may externally extend from a downstream side of the linear portion 103 in a radial direction. The first fastening portion 104 may extend in the circumferential direction along a downstream circumference of the linear portion 103. A plurality of first fastening holes may be formed through the first fastening portion 104 in an axial direction. The plurality of first fastening holes may be disposed to be spaced apart from one another along the circumferential direction.

A protrusion 105 may protrude axially from an outer end of the first fastening portion 104. The protrusion 105 may extend in the circumferential direction along an outer circumference of the first fastening portion 104. The protrusion 105 may be formed to surround an outer circumferential surface of the second fastening portion 134, which will be described hereinafter.

The rotational shaft 106 may be disposed in or at a center of the casing. The rotational shaft 106 may extend along the axial direction through the center of the casing.

One (first) end portion of the rotational shaft 106 may be accommodated inside of the shroud 100. The impeller 113 may be rotatably mounted on the one end portion of the rotational shaft 106.

The impeller 113 may include a hub 114 and a plurality of blades 116. The impeller 113 may be configured in the form of a mixed flow fan, for example.

The hub 114 may be inclined so that its diameter increases in a conic shape along the axial direction. A diameter of the hub 114 may gradually increase from an upstream end portion to a downstream end portion of the hub 114 based on an air flow direction.

A shaft coupling groove 115 may be formed inside of an upstream center portion of the hub 114 so that the one end portion of the rotational shaft 106 may be coupled to a center of the hub 114. An inner diameter of the shaft coupling groove 115 may correspond to a diameter of the rotation shaft 106, so that the rotational shaft 106 may be, for example, press-fitted to the shaft coupling groove 115. With this structure, the upstream end portion of the shaft coupling groove 115 may have a diameter smaller than the diameter of the rotational shaft 106 so that the upstream end portion of the rotational shaft 106 is caught in a thrust direction.

Coupling holes may be formed in the hub 114 and the upstream end portion of the shaft coupling groove 115 so that the hub 114 and the rotational shaft 106 may be coupled to each other. The blade 116 may protrude obliquely from an outer circumferential surface of the hub 114 at a preset or predetermined angle with respect to a radial direction. The blade 116 may spirally extend along an outer circumferential surface of the hub 114.

A plurality of blades 116 may be provided. The plurality of blades 116 may be spaced apart from each other at preset or predetermined intervals along the circumferential direction of the hub 114.

With this configuration, the impeller 113 may rotate together with the rotational shaft 106. The plurality of blades 116 that rotate at high speed together with the hub 114 may rotate air in an inner space of the shroud 100 to suction external air into the shroud 100 through the suction port 101.

The motor housing 109 may be disposed on the downstream side of the shroud 100. The motor housing 109 may include a first bearing housing 110, a cover part (cover) 112, and a flow path part (flow path). The rotational shaft 106 may be rotatably supported by the first bearing 107 and a second bearing 108. The first bearing 107 may be disposed on one (first) side of the rotational shaft 106, for example, on the upstream side of the rotational shaft 106 based on an air flow direction.

The second bearing 108 may be disposed on another (second) side of the rotational shaft 106, for example, on a downstream side of the rotational shaft 106 based on the air flow direction. The first bearing 107 may be disposed on the downstream side of the hub 114 to be adjacent to the impeller 113. The bearings 107 and 108 may be implemented as ball bearings or air bearings, for example.

A rotor 118 and a stator 119 which constitute a motor 117 described hereinafter may be disposed between the first bearing 107 and the second bearing 108. A first bearing support portion may be disposed on one side of the rotational shaft 106. The first bearing 107 may be press-fitted to the first bearing support portion.

The first bearing 107 may be accommodated in the first bearing housing 110. The first bearing housing 110 may be formed in a cylindrical shape, for example. The first bearing housing 110 may protrude from an inner surface of the cover part 112, which will be described hereinafter, toward the hub 114 (see FIG. 3) or protrude in the axial direction toward the motor 117 (see FIGS. 4(b) and 5). The first bearing housing 110 may extend along the circumferential direction to surround an outer circumferential surface of the first bearing 107.

A first stopper 111 may protrude radially inward from one axial end, for example, an upstream end, of the first bearing housing 110. The first stopper 111 may restrict movement of the first bearing 107 in a thrust direction while it is accommodated in the first bearing housing 110.

For example, when the impeller 113 rotates, air is suctioned into the inside of the shroud 100 through the suction port 101, moves along the inner surface of the shroud 100, and flows into the flow path part described hereinafter. At this time, when the air moves in a first axial direction from the suction port 101 of the shroud 100 toward the first fastening portion 104, thrust may act in a second axial direction, which is opposite to the first axial direction, according to the action-reaction law. The thrust may act on the rotational shaft 106 and the impeller 113. According to this, the first stopper 111 may restrict the first bearing 107 coupled to the rotational shaft 106 from being moved in the thrust direction due to the thrust.

The cover part 112 may be formed in a disk shape, for example. The cover part 112 may extend to protrude in the radial direction from an outer circumferential surface of the first bearing housing 110 toward an upstream end of an inner wall part (inner wall) 130 of the flow path part, which will be described hereinafter. The cover part 112 may extend in the circumferential direction along the outer circumference of the first bearing housing 110.

The cover part 112 may be configured to connect the first bearing housing 110 and the flow path part. A radial inner side of the cover part 112 may surround the outer circumferential surface of the first bearing housing 110. A radial outer side of the cover part 112 may be connected to one end of the inner wall part 130 of the flow path part. The radial inner side of the cover part 112 refers to one (first) end of the cover part 112 that faces the rotational shaft 106 in the radial direction. The radial outer side of the cover part 112 refers to another (second) end of the cover part 112 that faces the opposite direction to the rotational shaft 106 in the radial direction.

The cover part 112 may define one surface of a motor accommodating portion, which will be described hereinafter, for example, an inner surface of the motor housing 109 that faces the rotor 118 and the stator 119 of the motor 117 in the axial direction. The motor housing 109 may have the flow path part which may include the inner wall part 130, an outer wall part (outer wall) 133, and the vane 135.

The inner wall part 130 may be formed in a cylindrical shape, for example, with a first diameter. One axial end of the inner wall part 130 may be connected to an outer end of the cover part 112. The axial direction of the inner wall part 130 refers to a longitudinal direction of the inner wall part 130.

The inner wall part 130 may define therein the motor accommodating portion together with the cover part 112. The motor accommodating portion may be disposed inside of the inner wall part 130, and the flow path part may be disposed outside of the inner wall part 130.

The outer wall part 133 may be disposed to be radially spaced apart from an outer circumferential surface of the inner wall part 130. The outer wall part 133 may be formed in a cylindrical shape, for example, with a second diameter greater than a first diameter.

An upstream end of the outer wall part 133 may be accommodated inside of the downstream end of the shroud 100. The upstream end of the outer wall part 133 may be coupled to the downstream end of the shroud 100.

The outer wall part 133 may further include the second fastening portion 134. The second fastening portion 134 may externally protrude from the upstream end of the outer wall part 133 in the radial direction. The second fastening portion 134 may extend in the circumferential direction along an outer circumference of the outer wall part 133. A plurality of second fastening holes may be formed through the second fastening portion 134 in the axial direction.

The plurality of second fastening holes may be disposed to be spaced apart from each other in the circumferential direction in the second fastening portion 134. The first fastening holes and the second fastening holes may be disposed to overlap each other in the axial direction. A fastening member, such as a screw, may be fastened through the first fastening hole and the second fastening hole.

The outer wall part 133 may define an appearance of the fan motor together with the shroud 100. The flow path part through which air flows may be defined between the outer wall part 133 and the inner wall part 130. The flow path part may be disposed in the downstream side of the shroud 100. When the shroud 100 and the motor housing 109 are viewed in the axial direction, the flow path part may be disposed inside of the shroud 100.

Air suctioned by the impeller 113 may move along the flow path part in the shroud 100. The flow of air moving along the flow path part may be referred to as a main flow.

A plurality of vanes 135 may be disposed between the inner wall part 130 and the outer wall part 133. The vanes 135 may protrude in the radial direction from the outer circumferential surface of the inner wall part 130 to the inner circumferential surface of the outer wall part 133. The vanes 135 may be disposed between the inner wall part 130 and the outer wall part 133 to be inclined at a preset or predetermined angle with respect to the axial direction.

One (first) radial end of the vane 135 may be connected to the outer circumferential surface of the inner wall part 130, and another (second) radial end of the vane 135 may be connected to the inner circumferential surface of the outer wall part 133. The vane 135 is formed in a curved shape to be inclined with respect to the axial direction along the outer circumferential surface of the inner wall part 130 or the inner circumferential surface of the outer wall part 133. A curvature of the vane 135 may differ along the axial direction. For example, the curvature of the vane 135 may increase from the upstream side to the downstream side of the flow path part.

With this structure, the vanes 135 may guide the flow of air generated by the impeller 113 in one direction. For example, the plurality of vanes 135 may maintain a smooth flow of air by converting the rotational flow of air from the circumferential direction of the impeller 113 into the axial direction.

The vane 135 may be implemented as a single-stage vane or an N-stage vane (N is a natural number equal to or greater than 2) from the upstream side to the downstream side of the motor housing 109 based on an air flow direction. A single-stage vane means that one integral vane 135 is formed in the axial direction along the outer circumferential surface of the inner wall part 130 or the inner circumferential surface of the outer wall part 133. An N-stage vane mean that a plurality of vanes 135 are formed along the outer circumferential surface of the inner wall part 130 or the inner circumferential surface of the outer wall part 133 to be separated from one another in the axial direction.

In this embodiment, vane 135 is shown implemented as a two-stage vane. The two-stage vane 135 may be formed of a first vane 1352 disposed at the upstream side of the flow path part and a second vane 1353 disposed at the downstream side of the flow path part. The flow path part refers to a portion where the vane 135 is formed. An axial length of the flow path part may refer to an axial length of the vane 135.

The flow path part may be configured to be divided into a first flow path part (first flow path) and a second flow path part (second flow path). The first flow path part may be disposed at an upstream side of the flow path part based on an air flow direction. A plurality of first vanes 1352 may be disposed inside of the first flow path part.

The second flow path part may be disposed at a downstream side of the flow path part based on an air flow direction. A plurality of second vanes 1353 may be disposed inside of the second flow path part.

Radial widths of the first flow path part and the second path part may be maintained constant or may be formed differently along the axial direction. This embodiment shows that a radial width W of the flow path part is maintained constant.

A thickness of the inner wall part 130 may be different along the axial direction. The inner wall part 130 may be divided into a first inner wall portion (first inner wall) 131 and a second inner wall portion (second inner wall) 132 depending on a location of the flow path part. The first inner wall portion 131 may be disposed in the first flow path part.

The second inner wall portion 132 may be disposed in the second flow path part. For example, a thickness of the first inner wall portion 131 may be thinner than a thickness of the second inner wall portion 132. A sum of the thickness of the first inner wall portion 131 and the thickness of a flow inner wall portion 136 of a flow path housing, which will be described hereinafter, may be formed to correspond to the thickness of the second inner wall portion 132.

The motor housing 109 may further include a flow path housing. The flow path housing may be disposed in the first flow path part. The flow path housing may form the first flow path part. The flow path housing may include a flow path inner wall portion (flow path inner wall) 136, a flow path outer wall portion (flow path outer wall) 137, and the first vane 1352.

The flow path inner wall portion 136 may be formed in a cylindrical shape, for example. The flow path inner wall portion 136 may have an axial length corresponding to an axial length of the first inner wall portion 131. The flow path inner wall portion 136 may extend in the circumferential direction along the outer circumference of the first inner wall portion 131.

The flow path inner wall portion 136 may surround an outer circumferential surface of the first inner wall portion 131. The flow path inner wall portion 136 and the first inner wall portion 131 may be coupled to each other so that an inner circumferential surface of the flow path inner wall portion 136 and the outer circumferential surface of the first inner wall portion 131 come into contact with each other. The flow path inner wall portion 136 and the first inner wall portion 131 may be disposed to overlap each other in the radial direction.

An outer circumferential surface of the flow path inner wall portion 136 and an outer circumferential surface of the second inner wall portion 132 may define the same surface along the longitudinal direction (axial direction) of the flow path inner wall portion 136 and the second inner wall portion 132. This may minimize the flow resistance of air.

A bent portion 138 may be formed on an upstream end of the flow path inner wall portion 136 to be bent toward an outer circumferential portion of the cover part 112. A concave groove 139 may be formed in an edge portion of the cover part 112 to which the first inner wall portion 131 may be connected. The concave groove 139 may be formed to be concave radially inward from the outer circumferential portion of the cover part 112.

With this structure, the bent portion 138 may be coupled to the concave groove 139. The inner circumferential surface of the flow path inner wall portion 136 and the outer circumferential surface of the first inner wall portion 131 may be coupled to each other in close contact. The bent portion 138 may be disposed adjacent to the downstream end of the hub 114, and the hub 114 and the bent portion 138 may form a streamlined curved surface. Flow resistance may be minimized during the movement of air from the hub 114 to the bent portion 138.

The flow path outer wall portion 137 may be formed in a cylindrical shape, for example. The flow path outer wall portion 137 may have an axial length corresponding to an axial length of the flow path inner wall portion 136. The flow path outer wall portion 137 may be disposed to be spaced apart radially outward from an outer circumferential surface of the flow path inner wall portion 136 at a preset or predetermined interval.

The flow path outer wall portion 137 may extend in the circumferential direction along an outer circumference of the plurality of first vanes 1352. A thickness of the flow path outer wall portion 137 may be formed to be thinner than a thickness of the linear portion 103 of the shroud 100. The thickness of the flow path outer wall portion 137 may be formed to be thinner than a thickness of the outer wall part 133.

The flow path outer wall portion 137 may be coupled to an inner circumferential surface of the linear portion 103 of the shroud 100. For this purpose, a coupling groove may be formed in the inner circumferential surface of the linear portion 103 to be concave radially outward. The coupling groove may extend in the circumferential direction along the inner circumference of the linear portion 103.

With this structure, the flow path outer wall portion 137 may be caught in the coupling groove, thereby being restricted from moving in a thrust direction. The flow path housing may be supported by being coupled between the first inner wall portion 131 of the motor housing 109 and the linear portion 103 of the shroud 100.

The inner circumferential surface of the flow path outer wall portion 137 and the inner circumferential surface of the outer wall part 133 may form a same surface along a longitudinal direction of the flow path outer wall portion 137 and the outer wall part 133.

A plurality of the first vane 1352 may be disposed between the flow path inner wall portion 136 and the flow path outer wall portion 137. The plurality of first vanes 1352 may be spaced apart from one another in the circumferential direction along the outer circumferential surface of the flow path inner wall portion 136 or the inner circumferential surface of the flow path outer wall portion 137. An inside of the first vane 1352 may be connected to the flow path inner wall portion 136, and an outside of the first vane 1352 may be connected to the flow path outer wall portion 137. The first vane 1352 may be formed in a curved shape to be inclined with respect to the axial direction along the outer circumferential surface of the flow path inner wall portion 136 or the inner circumferential surface of the flow path outer wall portion 137.

The flow path inner wall portion 136, the flow path outer wall portion 137, and the first vanes 1352 of the flow path housing may define the first flow path part. The second inner wall portion 132, the outer wall part 133, and the second vanes 1353 may define the second flow path part.

The outer wall part 133 may be disposed on the downstream side of the flow path outer wall portion 137. The outer wall part 133 may be disposed to be spaced apart from an outside of the second inner wall portion 132 at a preset or predetermined interval.

Figure 7:
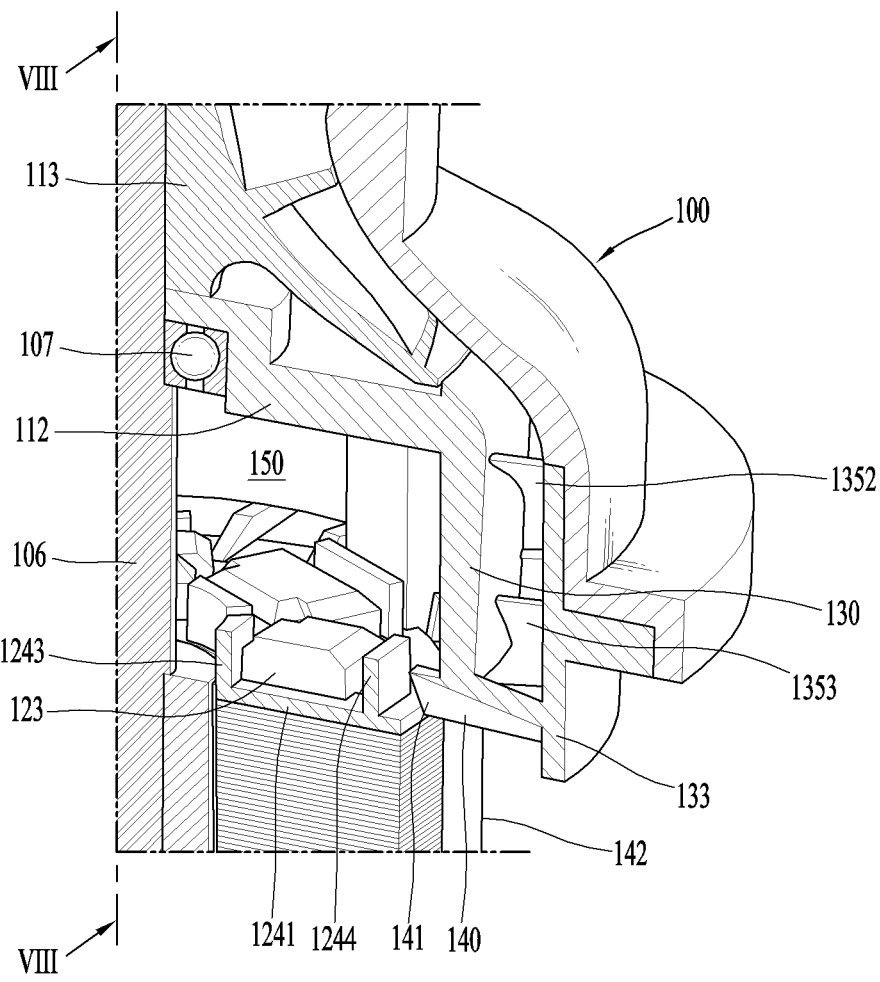
FIG. 7 is a conceptual view of a height by which a boss portion of an insulator protrudes in FIG. 1.
Figure 8:
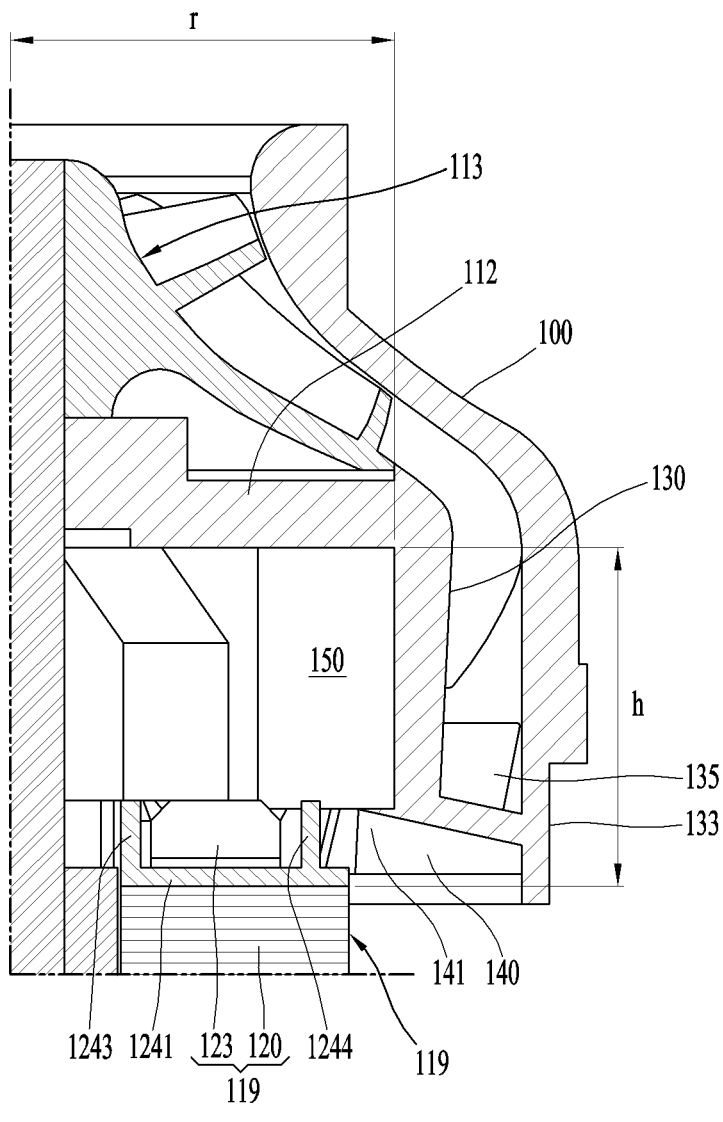
FIG. 8 is a conceptual view, viewed in a direction VIII in FIG. 7, which illustrates a radius and height of an air pocket.

A sum of axial lengths (heights) of the flow path outer wall portion 137 and the outer wall part 133 may be equal to a sum of axial lengths (heights) of the first inner wall portion 131 and the second inner wall portion 132 based on an inner surface of the motor housing 109, namely, the inner wall of the cover part 112 (see FIGS. 4(*b*) to 5 and 9), or may be greater than the sum of the axial lengths (heights) of the first inner wall portion 131 and the second inner wall portion 132 (see FIGS. 3, 7, and 8).

Referring to FIGS. 4(*b*) to 5 and 9, when the sum of the axial lengths of the first inner wall portion 131 and the second inner wall portion 132 is equal to the sum of the axial lengths of the flow path outer wall portion 137 and the outer wall part 133, a straightness of a flow of air guided through the vane 135 in the axial direction may be improved. This is also more effective in reflux flow, which will be described hereinafter.

Referring to FIGS. 3, 7, and 8, when the sum of the axial lengths of the first inner wall portion 131 and the second inner wall portion 132 is smaller than the sum of the axial lengths of the flow path outer wall portion 137 and the outer wall part 133 based on the inner surface of the cover part 112, an opening may be formed in the radial direction in the downstream end of the second inner wall portion 132. A vane extension portion 140 and a vane protrusion portion 141 may extend and protrude from the second vane 1353 through the opening.

The vane extension portion 140 may extend radially inward from the downstream end 1351 of the second vane 1353 to cover a thickness surface of the downstream end of the second inner wall portion 132. The vane protrusion portion 141 may protrude from the inner end of the vane extension portion 140 to be more inward in the radial direction than the inner circumferential surface of the second inner wall portion 132.

The vane extension portion 140 and the vane protrusion portion 141 may convert the flow direction of air, which is discharged from a discharge portion at the downstream end 1351 of the second vane 1353, from the axial direction to a radially inward direction toward the upstream space of the motor 117. This may minimize the flow resistance of the air discharged from the outlet of the second vane 1353.

The second fastening portion 134 may be formed to protrude radially outward from the upstream end of the outer wall part 133. The second fastening portion 134 extends in the circumferential direction along the outer circumference of the outer wall part 133. The first fastening portion 104 and the second fastening portion 134 may be disposed to overlap each other in the axial direction.

A second fastening hole may be formed through the second fastening portion 134 in the axial direction. A plurality of the second fastening hole may be provided in the second fastening portion 134. The plurality of second fastening holes may be disposed to be spaced apart in the circumferential direction along the circumference of the second fastening portion 134. The second fastening holes may be disposed to overlap the first fastening holes in the axial direction.

With this structure, a fastening member, such as a screw, may be coupled to the first fastening portion 104 and the second fastening portion 134 through the first fastening hole and the second fastening hole. The second fastening portion 134 may be coupled to the downstream side of the first fastening portion 104. The shroud 100 and the motor housing 109 may be fastened by a plurality of fastening members.

A plurality of the second vane 1353 may be disposed between the second inner wall portion 132 and the outer wall part 133. A number of first vanes 1352 and a number of second vanes 1353 may be different from each other. The inner side of the second vane 1353 may be connected to the second inner wall portion 132, and the outer side of the second vane 1353 is connected to the outer wall part 133. The first flow path part and the second flow path part may be connected in communication with each other in the axial direction.

The downstream end of the first vane 1352 and the upstream end of the second vane 1353 may be spaced apart from each other with a gap therebetween. Accordingly, air moving along the first vanes 1352 and air moving along the second vanes 1353 may smoothly flow continuously without interruption.

The motor accommodating portion in which the motor 117 is accommodated may be disposed at the radial inner side of the inner wall part 130. In order to support the motor 117, a support portion 142 may be disposed on the inner circumferential surface of the inner wall part 130. The support portion 142 may protrude radially inward from the inner circumferential surface of the inner wall part 130.

A plurality of the support portion 142 may be provided on the inner circumferential surface of the inner wall part 130. The plurality of support portions 142 may be spaced apart from one another in the circumferential direction along the inner circumferential surface of the inner wall part 130. In this embodiment, three support portions 142 are disposed at equal intervals of 120 degrees.

Discharge passages 144 may be formed between the plurality of support portions 142 adjacent to each other in the circumferential direction. The discharge passage 144 may formed through the downstream end of the motor housing 109 in the radial direction. The discharge passage 144 may be connected to communicate with the flow path part.

With this structure, the stator core 120 may be exposed to the outside of the motor housing 109 through the discharge passage 144. In addition, the stator core 120 may be in contact with air passing through the vane 135 through the discharge passage 144 or with external air of the motor housing 109, thereby dissipating heat generated in the stator core 120.

The support portion 142 may extend axially from the inner circumferential surface of the inner wall part 130. The support portion 142 may protrude and extend in the axial direction from the downstream end of the second inner wall portion 132. The support portion 142 may be formed to surround the outer circumferential surface of the stator core 120, which will be described hereinafter. An axial length of the support portion 142 may be longer than an axial length of the stator core 120.

The motor 117 may include a rotational shaft 106, a rotor 118, and a stator 119. The rotational shaft 106 may be disposed in or at a center of each of the shroud 100, the motor housing 109, and a second housing, which will be described hereinafter. The rotational shaft 106 may extend along a center line which passes through the centers of the shroud 100, the motor housing 109, and the second housing in the axial direction.

A first bearing support portion to which the first bearing 107 may be press-fitted, for example, may be formed on one (first) side of the rotational shaft 106. A second bearing support portion to which the second bearing 108 may be press-fitted, for example, may be formed on another (second) side of the rotational shaft 106.

The rotor 118 may be disposed between the first bearing support portion and the second bearing support portion. A rotor support portion may be disposed between the first bearing support portion and the second bearing support portion. The rotor 118 may include permanent magnets. The rotor 118 may optionally further include a rotor core.

The permanent magnets may be coupled to the rotational shaft 106 or coupled to the rotor core. In this embodiment, the rotor core is omitted to miniaturize the motor 117, and the permanent magnets are shown coupled to the rotor support portion of the rotational shaft 106.

The stator 119 may be configured to surround the rotor 118, for example, the permanent magnets. The permanent magnets may be spaced apart from the stator 119 with a preset or predetermined air gap in the radial direction and rotatably mounted.

The stator 119 may include a stator core 120 and a stator coil 123. The stator core 120 may include a back yoke, a plurality of teeth 121, and a plurality of slots 122. The back yoke may be formed in an annular shape, for example.

The plurality of teeth 121 may protrude radially inward from the inner circumferential surface of the back yoke toward the rotational shaft 106. The plurality of teeth 121 may be spaced apart from one another in the circumferential direction along the inner circumferential surface of the back yoke. Each slot 122 may be formed between two teeth 121 adjacent to each other in the circumferential direction.

The slot 122 may be formed through the stator core 120 in the axial direction. The plurality of teeth 121 and the plurality of slots 122 may be alternately disposed along the circumferential direction.

The stator coil 123 may be configured as a plurality of three-phase coils. The stator coil 123 may be wound on the tooth 121. An insulator 124 may be disposed for electrical insulation between the stator coil 123 and the stator core 120.

The slots 122 may form internal flow paths for cooling the motor 117. Air may flow through the internal flow paths to cool the motor 117.

A lead wire 125 that applies power to one side of the stator coil 123 may extend in the axial direction. The lead wire 125 may receive external power through a power supply connector 126, which will be described hereinafter.

With this structure, when power, such as alternating current (AC), is applied to the stator coil 123, a magnetic field is generated around the stator coil 123. The rotor 118 rotates relative to the stator 119 by electromagnetic interaction between the rotor 118 and the stator 119. The permanent magnet and the rotational shaft 106 rotate together to generate a rotational force. The impeller 113 coupled to one side of the rotational shaft 106 rotates by the rotational force transmitted through the rotational shaft 106.

The stator core 120 may be, for example, press-fitted to the plurality of support portions 142. With this structure, the plurality of support portions 142 may support the stator 119.

A motor seating portion 143 may be disposed in the inner surface of the support portion 142. The motor seating portion 143 may be formed radially concave in the inner surface of the support portion 142. A circumferential width of the support portion 142 may be smaller than a spacing between the plurality of support portions 142 adjacent to each other.

The inner surface of the motor seating portion 143 may be formed in a curved shape with a curvature corresponding to the outer circumferential surface of the stator core 120. With this structure, the motor seating portion 143 may be in surface contact with the outer circumferential surface of the stator core 120 while surrounding the same. A step portion may be formed on one axial end of the motor seating portion 143, for example, on the upstream end of the motor seating portion 143. The step portion may be formed to align the axial position of the stator core 120.

The step portion may define a radial step surface at a boundary between the support portion 142 and the motor seating portion 143. The step portion may cover a portion of one axial end of the stator core 120.

With this structure, when the stator core 120 is press-fitted between the plurality of support portions 142, one axial end of the stator core 120 may be caught by the step portion. The step portion may restrict the stator core 120 from moving in a thrust direction in a coupled state to the support portion 142. Accordingly, a coupling position of the stator core 120 may be aligned by the step portion.

The second housing may be disposed at the downstream side of the motor housing 109. The second housing may include a second bearing housing 145, a bridge 147, and a coupling portion 148.

The second bearing 108 may be accommodated in the second bearing housing 145. The second bearing housing 145 may be formed in a cylindrical shape, for example. The second bearing housing 145 may extend along the circumferential direction to surround the outer circumferential surface of the second bearing 108.

A second stopper 146 may protrude radially inward from one axial end of the second bearing housing 145. The one axial end of the second bearing housing 145 may refer to one end in a first axial direction, based on an air flow direction, of both axial ends of the second bearing housing 145. With this structure, the second stopper 146 may restrict movement of the second bearing 108 in the first axial direction while the second bearing 108 is accommodated in the second bearing housing 145.

The bridge 147 may extend in the radial direction from the outer circumferential surface of the second bearing housing 145 toward the inner surface of the coupling portion 148, which will be described hereinafter. A plurality of the bridge 147 may be provided. The plurality of bridges 147 may be spaced apart from one another in the circumferential direction along the outer circumference of the second bearing housing 145. With this structure, the bridges 147 may connect the second bearing housing 145 and the coupling portion 148.

The coupling portion 148 may protrude from the outer end of the bridge 147 toward the downstream end of the support portion 142. The coupling portion 148 may be coupled to the downstream end of the support portion 142. The coupling portion 148 may be disposed to surround the downstream end of the support portion 142. For example, a support portion accommodating groove 149 may be formed concave in the axial direction in one axial end of the coupling portion 148.

The support portion accommodating groove 149 may include a first surface, a second surface, and a third surface. The first surface of the support portion accommodating groove 149 may be formed to face the downstream end of the support portion 142 in the axial direction.

The second surface of the support portion accommodating groove 149 may extend in the axial direction from one end of the first surface to face one of two side surfaces of the support portion 142, which are opposite in the circumferential direction. The third surface of the support portion accommodating groove 149 may be disposed to face the other side surface of the two side surfaces of the support portion 142, which are opposite in the circumferential direction.

The downstream end of the support portion 142 may be inserted into the support portion accommodating groove 149 of the coupling portion 148. Optionally, the support portion 142 and the coupling portion 148 may be fastened using, for example, a fastening member, such as a screw.

A controller may be disposed on the downstream side of the second housing. The controller may be configured to control an overall operation of the fan motor, such as the motor 117. The controller may include a printed circuit board 127, an insulated-gate bipolar transistor (IGBT) 128, and a capacitor 129.

A power source connector 126 may be disposed on the printed circuit board 127. The power source connector 126 may protrude from the printed circuit board 127 to be connectable to the lead wire 125. A plurality of the power source connector 126 may be provided to correspond to the lead wires 125. The power source connector 126 may be connected to an external power source. With this structure, external power may be applied to the stator coil 123 through the power source connector 126 and the lead wire 125.

The outer circumferential surface of the stator core 120 and the inner circumferential surface of the inner wall part 130 may be spaced apart from each other in the radial direction at a preset or predetermined gap by the radial thickness of the support portion 142. The preset or predetermined gap may define the discharge passage 144.

The discharge passage 144 may be a passage through which air is discharged from an air pocket 150, which will be described hereinafter, to the outside of the motor housing 109. The discharge passage 144 may be connected to communicate with the flow path part.

The gap between the discharge passages 144 may be an important factor that determines the cooling performance of the motor 117. This is because, if the gap is too large (wide), air passing through the second vane 1353 acts as an air curtain, causing the problem that air in the motor accommodating portion is accumulated inside of the motor housing 109. If the gap is too small (narrow), the flow resistance may increase, which may cause a problem that air in the motor accommodating portion cannot be discharged to the outside through the discharge passage 144.

To solve these problems, a minimum gap of the discharge passage 144 may be equal to or greater than the thickness of the inner wall part 130 or the outer wall part 133. Additionally, the maximum gap of the discharge passage 144 may be smaller than or equal to a flow path gap between the outer circumferential surface of the inner wall part 130 and the inner circumferential surface of the outer wall part 133.

The inner wall part 130 and the outer wall part 133 may have the same thickness. The thickness of the inner wall part 130 and the outer wall part 133 may be equal to or smaller than the flow path gap between the outer circumferential surface of the inner wall part 130 and the inner circumferential surface of the outer wall part 133.

In embodiments, except for a case in which the first inner wall portion 131 and the second inner wall portion 132 are separately disposed, description of the inner wall part 130 will be commonly applied to the first inner wall portion 131 and the second inner wall portion 132.

An outer diameter Do of the motor 17 according to the comparative example of FIGS. 3(*a*) and 4(*a*) and an outer diameter Do of the motor 117 according to the embodiment of FIGS. 3(*b*) and 4(*b*) are the same. The radial width of the vane 35 according to the comparative example of FIGS. 3(*a*) and 4(*a*) and the radial width of the vane 135 according to the embodiment of FIGS. 3(*b*) and 4(*b*) are the same.

However, the inner diameter of the inner wall part 130 of the motor housing 109 according to the embodiment of FIGS. 3(*b*) and 4(*b*) is smaller than the inner diameter of the inner wall 30 of the motor housing 9 according to the comparative example of FIGS. 3(*a*) and 4(*a*). The outer diameter of the outer wall part 133 of the motor housing 109 according to the embodiment of FIGS. 3(*b*) and 4(*b*) is smaller than the outer diameter of the outer wall 33 of the motor housing 9 according to the comparative example of FIGS. 3(*a*) and 4(*a*).

FIGS. 3(*a*) and 4(*a*) illustrate the comparative examples for comparison with the example of FIGS. 3(*b*) and 4(*b*) of embodiments. Referring to FIGS. 3(*a*) and 4(*a*), it is shown that the gap G1 of the discharge passage 44 according to the comparative example is larger than a flow path gap G2 between the outer circumferential surface of the inner wall 30 and the inner circumferential surface of the outer wall 33.

The flow rate of air passing through the vane 135 is faster than the flow rate of air inside of the motor housing 109. According to Bernoulli's equation, a pressure of air decreases when the flow rate of air is fast.

However, when the gap G1 of the discharge passage 44 is too large as in the comparative example, even if the flow rate of air passing through the vane 35 is fast, the speed of an air flow layer adjacent to the outer circumferential surface of the stator core 20 is relatively lower (slower) than the flow rate of the air passing through the vane 35. For this reason, the low speed of the air flow layer adjacent to the outer circumferential surface of the stator core 20 has a limit in generating pressure which is low enough to suction air inside of the motor housing 9 to the outside of the motor housing 9.

On the other hand, the minimum gap g1 of the discharge passage 144 according to the embodiment of FIGS. 3(*b*) and 4(*b*) may be equal to or greater than (≥) the thickness t of the inner wall part 130 or the outer wall part 133. Additionally, the maximum gap g1 of the discharge passage 144 may be equal to or smaller than (≤) the flow path gap g2 between the outer circumferential surface of the inner wall part 130 and the inner circumferential surface of the outer wall part 133. The maximum gap g1 of the discharge passage 144 may be equal to or smaller than (≤) the radial width g2 of the vane 135.

In embodiments, the gap of the discharge passage 144, that is, the gap d1 between the outer circumferential surface of the stator core 120 and the inner circumferential surface of the inner wall part 130 may be 3% to 11% of the outer diameter of the outer wall part 133 of the motor housing 109. This is because, if the gap of the discharge passage 144 is less than 3% of the outer diameter of the outer wall part 133, there is a problem that air cannot be discharged smoothly due to the flow resistance of the discharge passage 144. If the gap of the discharge passage 144 exceeds 11%, the flow rate of the air flow layer adjacent to the outer circumferential surface of the stator core 120 decreases, causing a problem that the suction force of air through the discharge passage 144 decreases.

According to embodiments, the gap of the discharge passage 144, that is, the gap between the outer circumferential surface of the stator core 120 and the inner circumferential surface of the inner wall part 130 is reduced, so that the speed of the air flow layer adjacent to the outer circumferential surface of the stator core 120 is significantly faster than the flow rate of the air inside the motor housing 109. Therefore, as the pressure of air adjacent to the outer circumferential surface of the stator core 120 is significantly lower than the pressure of air inside of the motor housing 109, the air inside of the motor housing 109 may be suctioned and discharged to the outside of the motor housing 109 through the discharge passage 144.

Further, the low pressure of the air adjacent to the outer circumferential surface of the stator core 120 may provide a suction force to suction the air inside of the motor housing 109, and thus, may serve as a power source for a reflux flow, which will be described hereinafter. Furthermore, a heat dome phenomenon in which the flow of hot air at the upstream side of the motor 117 stagnates may be eliminated.

Figure 6:
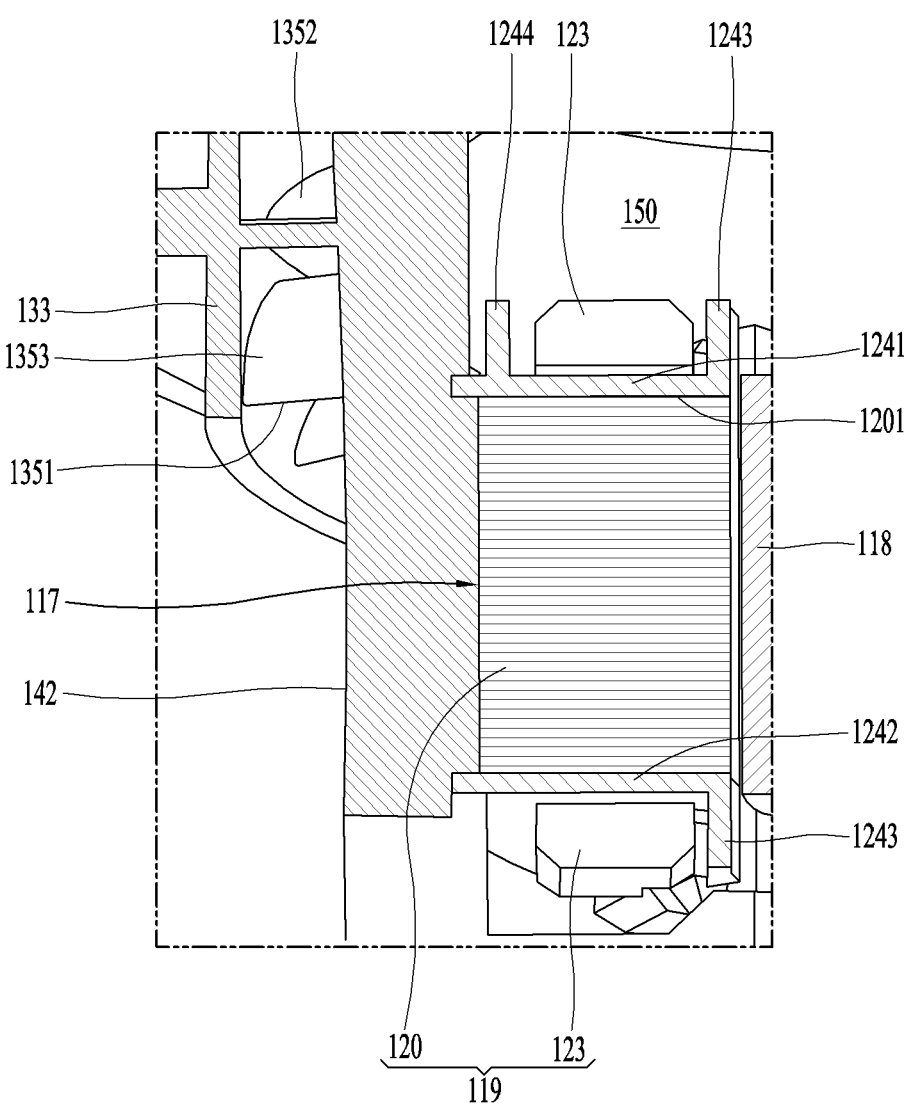
FIG. 6 is a conceptual view of a state in which an upstream end of a stator core and a discharge surface of a vane are located to correspond to each other in a radial direction, in an enlarged portion "VI" of FIG. 5.

FIG. 6 is a conceptual view of a state in which an upstream end of a stator core and a discharge surface of a vane are located to correspond to each other in the radial direction, in an enlarged portion "VI" of FIG. 5. FIG. 7 is a conceptual view of a height by which a boss portion of an insulator protrudes in FIG. 1. FIG. 8 is a conceptual view, viewed from a direction of VIII in FIG. 7, which illustrates a radius r and a height of an air pocket.

The upstream end 1201 of the motor 117 may be disposed to be spaced apart from the inner surface of the motor housing 109 at a preset or predetermined gap in the axial direction. The inner surface of the motor housing 109 may refer to the inner surface of the cover part 112. The inner surface of the motor housing 109 may be disposed to face the upstream end 1201 of the motor 117 in the axial direction. Additionally, the upstream end 1201 of the motor 117 may refer to the upstream end 1201 of the stator coil 123 and/or the stator core 120.

An insulator 124 may include insulator end portions 1241 and 1242 and insulator boss portions 1243 and 1244. The insulator end portions 1241 and 1242 include first insulator end portion 1241 that covers the upstream end 1201 of the stator core 120, and second insulator end portion 1242 that covers the downstream end of the stator core 120.

The insulator end portions 1241 and 1242 may be formed in a disk shape, for example. A plurality of the insulator boss portions 1243 and 1244 may be provided in each of the first insulator end portion 1241 and the second insulator end portion 1242. A plurality of the insulator boss portions 1243 and 1244 may be provided on inner side and outer side of the respective insulator end portions 1241 and 1242 with the stator coil 12 interposed therebetween.

The plurality of insulator boss portions 1243 and 1244 may include a plurality of inner insulator boss portions 1243 that protrudes in the axial direction from a radially inner side of the insulator end portion 1241, 1242, and a plurality of outer insulator boss portions 1244 that protrude in the axial direction from a radially outer side of the insulator end portion 1241, 1242. The plurality of inner insulator boss portions 1243 and the plurality of outer insulator boss portions 1244 may be disposed to be spaced apart from one another in the circumferential direction of the insulator end portion 1241, 1242.

The inner insulator boss portions 1243 may be disposed between the permanent magnet and the stator coil 123. The outer insulator boss portions 1244 may be disposed between the stator coil 123 and the inner wall part 130. With this structure, the insulator boss portions 1243 and 1244 may isolate the stator coil 123 from its surroundings so that a magnetic field generated in the stator coil 123 does not affect the surroundings.

Referring to FIGS. 7 and 8, the boss portion protrudes upward from the insulator end portion 1241, 1242. A protruded height of the boss portion may vary depending on an amount and thickness of the stator coil 123. For example, the height of the boss portion may be in the range of 2 to 5 mm.

An axial gap between the inner surface of the motor housing 109 and the upstream end 1201 of the motor 117 is an important factor that determines cooling performance of the motor 117. Air that is present inside of the motor housing 109 may absorb heat generated from the stator coil 123 and the upstream end 1201 of the stator core 120.

In a case in which a radius r of air pocket 150 is constant, when the axial gap between the inner surface of the motor housing 109 and the upstream end 1201 of the motor 117 is larger (wider), a volume for accommodating air to absorb heat generated from the motor 117, namely, the volume of the air pocket 150 more increases.

The air pocket 150 forms at least a portion of the motor accommodating portion. The air pocket 150 may be formed by the inner surface of the cover part 112 and the inner circumferential surface of the inner wall part 130. A volume V of the air pocket 150 may be $\pi r2 \times h$, where r denotes a radius of the air pocket 150, and h denotes a height of the air pocket 150.

The radius r of the air pocket 150 refers to a distance from a center line passing through the center of the rotational shaft 106 in the axial direction to the inner circumferential surface of the inner wall part 130. The height h of the air pocket 150 refers to an axial gap between the inner surface of the motor housing 109 and the upstream end 1201 of the motor 117. More specifically, the height h of the air pocket 150 may refer to an axial gap between the inner surface of the motor housing 109 and the upstream end 1201 of the stator core 120.

Therefore, in order to improve cooling performance of the motor 117, when the diameter of the air pocket 150 is constant, the axial gap between the inner surface of the motor housing 109 and the upstream end 1201 of the stator core 120 may be increased. Moreover, the upstream end 1201 of the motor 117 may be axially spaced apart from the inner surface of the motor housing 109 and located to correspond to the discharge portion (outlet) of the vane 135. The discharge portion of the vane 135 may refer to the downstream end 1351 of the vane 135. More specifically, a seating length of the stator core 120 corresponds to an axial distance from the inner surface of the motor housing 109 to the downstream end 1351 of the vane 135 (see FIG. 6).

In this embodiment, the height h of the air pocket 150 may be 22% to 42% of an outer diameter of the entire vane 135 or an outer diameter of the outer wall part 133. If the height h of the air pocket 150 is much smaller than 22%, the volume of the air pocket 150 in which the heat of the motor 117 may be absorbed may decrease, which may lower the cooling performance of the motor 117. If the height h of the air pocket 150 is much greater than 42%, the cooling performance of the motor 117 may increase, but the axial length of the fan motor may increase. This may have a negative effect on miniaturization of the fan motor.

In this embodiment, a phase difference $\Delta D$ refers to a value obtained by subtracting an axial distance between the inner surface of the motor housing 109 and the upstream end 1201 of the stator core 120 from an axial distance between the inner surface of the motor housing 109 and the downstream end 1351 of the vane 135. When the phase difference $\Delta D$ is 0 mm, an optimal cooling structure for the motor 117 may be achieved.

The phase difference $\Delta D$ may be smaller than or equal to a value $+h_p$ (0 mm+the height of the insulator boss portion 1243, 1244) and greater than or equal to a value $-h_p$ (0 mm—the height of the insulator boss portion 1243, 1244). Here, $h_p$ is greater than 0, where $h_p$ is the height of the insulator boss portion.

An effective cooling area refers to an area where the flow of air passing through the vane 135 directly hits the outer circumferential surface of the motor 117, for example, the stator core 120 and cools the same.

With the configuration according to the embodiment, when the height h of the air pocket 150 and the phase difference $\Delta D$ are limited to the numerical ranges, respectively, the effective cooling area is maximized to thus enhance the cooling effect of the motor 117. Further, air in the air pocket 150 absorbs heat of the motor 117, more particularly, the upstream end of the stator coil 123 and the upstream end 1201 of the stator core 120, thereby reducing a maximum saturation temperature. In other words, the cooling performance is enhanced.

In addition, the air in the air pocket 150 may absorb the heat of the motor 117, thereby delaying the time to reach the maximum saturation temperature. Ultimately, the air in the air pocket 150 may suppress or prevent a rapid increase in temperature of the motor 117, obtaining improved reliability of a product, such as a cleaner, for example.

Figure 9:
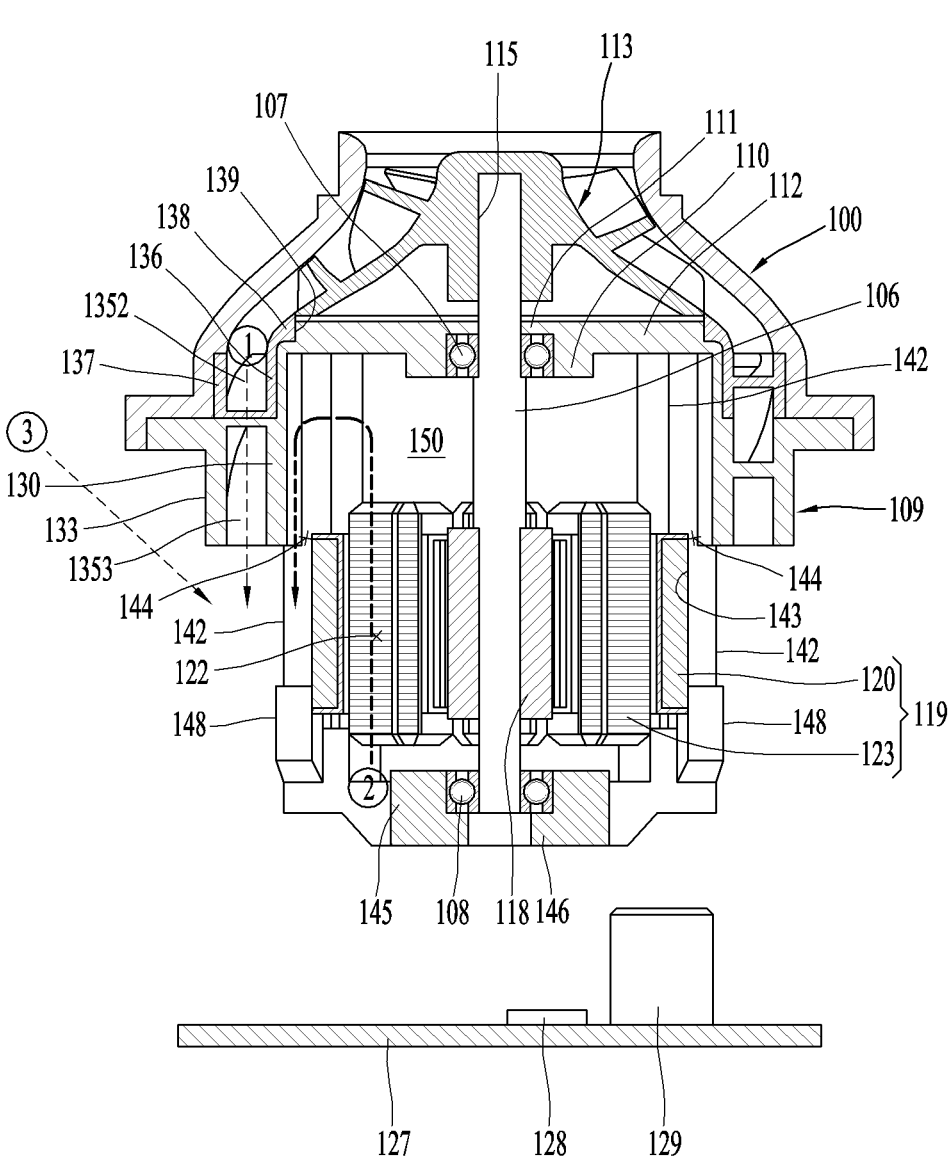
FIG. 9 is a conceptual view of a reflux flow inside of a motor housing according to the embodiment of FIG. 5.

FIG. 9 is a conceptual view of a reflux flow inside of the motor housing according to the embodiment of FIG. 5. In this embodiment, flows of air may be classified into a main flow and a reflux flow. The main flow may be referred to as a first flow ①. The reflux flow may be referred to as a second flow ②.

The main flow is formed by the impeller 113 as described above. As the impeller 113 rotates, external air flows into the shroud 100 through the suction port 101.

Air flowing into the shroud 100 moves to the flow path part along the flow path between the outer circumferential surface of the hub 114 of the impeller 113 and the inner circumferential surface of the shroud 100. Air, which flows along the flow path formed between the outer circumferential surface of the inner wall part 130 of the flow path part and the inner circumferential surface of the outer wall part 133, is guided by the vane 135 and discharged to the downstream end 1351, namely, the discharge portion of the vane 135.

As the flow path gap between the inner circumferential surface of the inner wall part 130 and the outer circumferential surface of the stator core 120 is very narrow, some of the air discharged from the discharge portion of the vane 135 hits the outer circumferential surface of the stator core 120, and the flow rate of air, which moves straight in the axial direction along the outer circumferential surface of the stator core 120 is very fast. This results in increasing the cooling performance of the motor 117.

Other of the air discharged from the discharge portion of the vane 135 passes through the outside of the motor 117 to be discharged to the outside of the motor housing 109, or may move to the PCB 127 through an outlet formed between the bridges 147 of the second housing to be discharged to the outside of the second housing while cooling the PCB 127, the IGBT 128, and the capacitor 129. In addition, external air of the outer wall part 133 of the motor housing 109 may hit the outer circumferential surface of the stator core 120 along with the main flow due to the high flow rate of the air passing through the discharge portion of the vane 135.

The reflux flow refers to when part of air discharged to the outside of the second housing is re-introduced into the air pocket 150, which is the inside of the motor housing 109, through the inner flow path of the motor 117, and then is discharged through the discharge passage 144. The discharge passage 144 refers to a passage between the outer circumferential surface of the stator core 120 and the inner circumferential surface of the inner wall part 130.

Explaining the path of the reflux flow, when a part or portion of air discharged from the discharge portion of the vane 135 hits the outer circumferential surface of the stator core 120, the flow rate of the air is significantly faster than the flow rate of air in the air pocket 150. Accordingly, the pressure of the discharge passage 144 is significantly lower than the pressure of the air pocket 150. With this structure, the air in the air pocket 150 is discharged straight along the outer circumferential surface of the stator core 120 together with the part of the air discharged from the discharge portion of the vane 135 due to the pressure difference between the discharge passage 144 and the air pocket 150.

By virtue of this reflux flow, a part or portion of air discharged to the outside of the second housing is discharged through the discharge passage 144 via the inner flow path formed between the outlet of the second housing and the stator coil 123 of the motor 117 and the air pocket 150. Accordingly, heated air inside of the motor 117 may be cooled using cool external air, thereby improving the cooling performance of the motor 117.

Additionally, the external air of the outer wall part 133 may move toward the outer circumferential surface of the stator core 120 due to the high flow rate of the air passing through the vane 135. This may be referred to as a third flow ③. With this configuration, the external air of the outer wall part 133 may cool the outer circumferential surface of the stator core 120, thereby improving the cooling performance of the motor 117.

Figure 10:
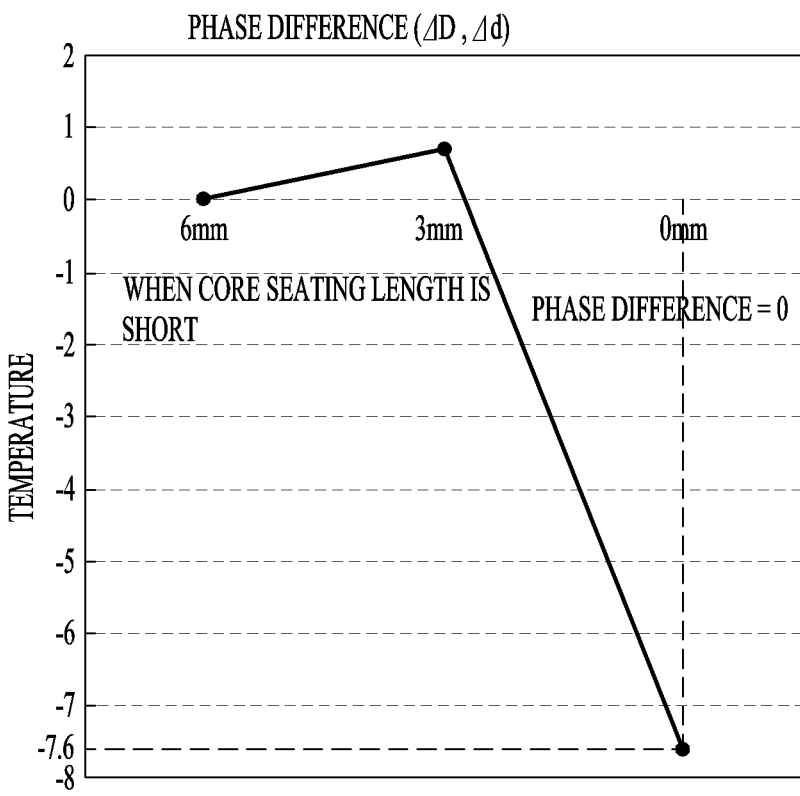
FIG. 10 is a graph showing changes in temperature of the motor according to a seating length (phase difference) of a stator core.
Figure 11A:
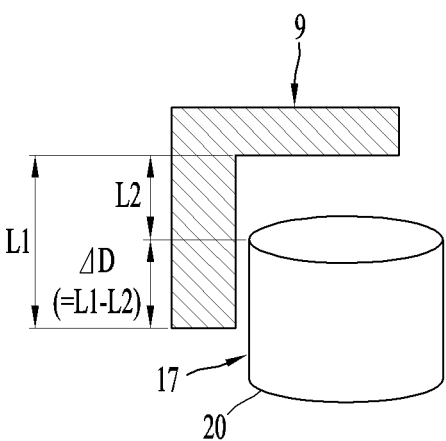
FIGS. 11A-11B are cross-sectional views of a disposition relationship between a motor housing and a stator according to the phase difference in FIG. 10, where
Figure 11B:
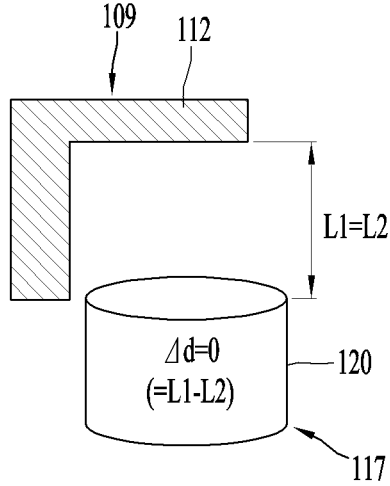

FIG. 10 is a graph showing changes in temperature of the motor according to a seating length (phase difference) of the stator core. FIGS. 11A-11B are cross-sectional views of a disposition relationship between the motor housing and the stator according to a phase difference in FIG. 10, where FIG. 11A illustrates the disposition relationship between the motor housing and the stator when the phase difference $\Delta D$ is greater than 0, and FIG. 11A illustrates the disposition relationship between the motor housing and the stator when the phase difference $\Delta D$ is 0.

Referring to FIG. 10, description will be given by comparing cases where a seating length of the stator core 120 is short (FIGS. 3(a) and 4(a)) and is an optimal length (FIGS. 3(b) and 4(b)) with cases where the phase difference $\Delta D$, $\Delta d$ (=the discharge portion (outlet) of the vane 135—the upstream end 1201 of the stator core 120) is 6 mm, 3 mm, and 0 mm.

An example of the case in which the seating length of the stator core 120 is short refers to a case in which the phase difference $\Delta D$ is 6 mm and 3 mm. An example of a case in which the seating length of the stator core 120 is the optimal length refers to a case in which the phase difference $\Delta d$ is 0 mm.

When the phase difference $\Delta D$ is 6 mm, the temperature of the motor 117 is 0, and when the phase difference $\Delta D$ is 3 mm, the temperature of the motor 117 is a value greater than 0 and smaller than 1, namely, approximately 0.8. When the phase difference $\Delta d$ is 0 mm, the temperature of the motor 117 is −7.6. The reason why the unit of temperature is not limited here is that this temperature value is not limited thereto but is relative to the phase difference $\Delta D$. With this structure, it can be seen that the temperature of the motor 117 has a lowest value when the phase difference $\Delta d$ is 0 mm Referring to FIGS. 11A-11B, the phase difference $\Delta D$, $\Delta d$ is L1–L2. L1 may denote the axial length of the vane 135 (including the first vane 1352 and the second vane 1353) based on the inner surface of the motor housing 109. Alternatively, L1 may denote the axial length of the inner wall part 130 based on the inner surface of the motor housing 109.

L2 may denote the seating length of the stator core 120. The seating length L2 of the motor 117 refers to the axial distance from the inner surface of the motor housing 109 to the upstream end 1201 of the stator core 120.

When the seating length of the stator core 120 according to the comparative example of FIG. 11A is short, for example, when the phase difference $\Delta D$ is 6 mm or 3 mm, the temperature of the motor 17 is 0 or 0.8 in FIG. 10. It is shown that the temperature of the motor 117 is relatively high.

When the seating length of the stator core 120 according to the embodiment of FIG. 11B is the optimal length, for example, when the phase difference $\Delta d$ is 0 mm, the temperature of the motor 117 is −7.6 in FIG. 10. It is shown that the temperature of the motor 117 is relatively low.

Figure 12:
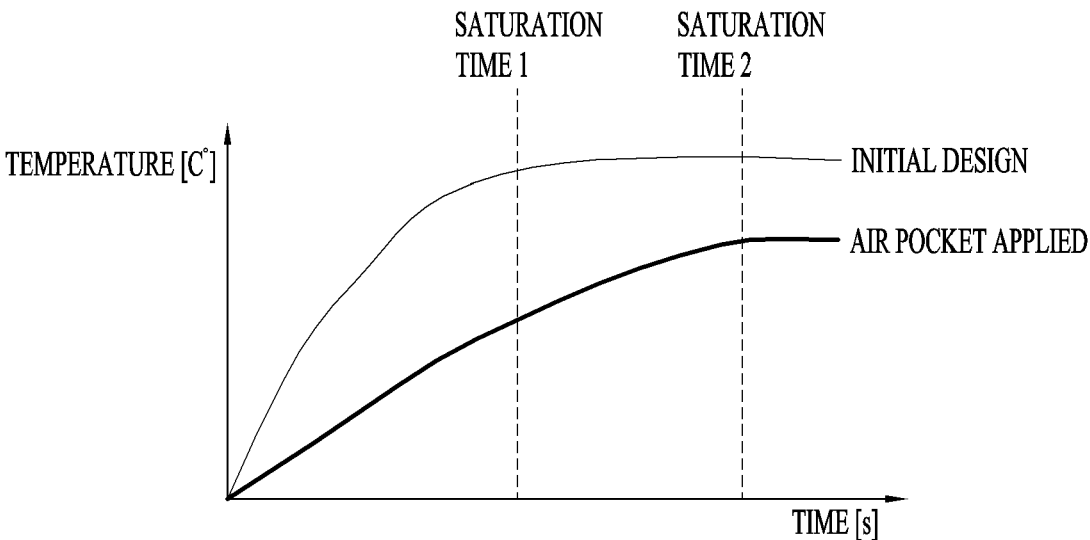
FIG. 12 is a graph for comparing a saturation time and saturation temperature of an existing structure and those of a structure to which an air pocket according to embodiments is applied.

FIG. 12 is a graph for comparing saturation time and saturation temperature of an existing structure and those of a structure to which an air pocket according to embodiments is applied.

Table 1 is a conceptual diagram showing the temperatures of the stator 119, magnet, bearing, for example, according to the seating length of the core.

TABLE 1

| | | Phase difference | | |
|---|---|---|---|---|
| | | 6 mm | 3 mm | 0 mm |
| | | | Coar seating length | |
| | | 12 mm | 15 mm | 18 mm |
| Top of coil | Maximum | 135.3 | 136.0 | 127.0 |
| | Variation | | 0.7 | −7.6 |
| | Average | 129.0 | 130.5 | 124.0 |
| | Variation | | 1.5 | −4.9 |
| Core average | | 101.6 | 100.9 | 98.4 |
| Magnet average | | 81.3 | 80.3 | 77.7 |
| Upper bearing | | 73.8 | 71.0 | 70.5 |
| Lower bearing | | 68.2 | 71.7 | 71.1 |

It is shown that the time (saturation time 2) taken to reach the saturation temperature to absorb the heat of the motor 117 when the air pocket 150 is applied to the inside of the motor housing 109 according to this embodiment is delayed, compared to the time (saturation time 1) taken to reach the saturation temperature when the air pocket 150 is not applied to the inside of the motor housing 109 according to the comparative example.

Table 1 shows the results of measuring the temperature (° C.) of the upstream end of the stator coil 123 according to the phase difference ΔD and the seating length of the stator core 120. In Table 1, the coil denotes the stator coil 123, the core denotes the stator core 120, the magnet denotes the permanent magnet, the upper bearing denotes the first bearing 107, and the lower bearing denotes the second bearing 108.

Table 1 shows examples in which the phase difference ΔD is 6 mm, 3 mm, and 0 mm. Also, examples in which the seating length of the stator core 120 according to the phase difference ΔD is 12 mm, 15 mm, and 18 mm are shown. As the phase difference ΔD decreases, the seating length of the stator core 120 increases.

When the phase difference ΔD is decreased from 6 mm to 3 mm, the seating length of the stator core 120 is increased from 12 mm to 15 mm, but the maximum temperature at a top of the stator coil 123 is increased by 0.7° C. When the phase difference ΔD is decreased from 6 mm to 0 mm, the seating length of the stator core 120 is increased from 12 mm to 18 mm, and the maximum temperature at the top of the stator coil 123 is decreased by 7.6° C.

When the phase difference ΔD is decreased from 6 mm to 3 mm, the seating length of the stator core 120 is increased from 12 mm to 15 mm, but the average temperature of the top of the stator coil 123 is increased by 0.7° C. When the phase difference ΔD is decreased from 6 mm to 0 mm, the seating length of the stator core 120 is increased from 12 mm to 18 mm, and the average temperature at the top of the stator coil 123 is decreased by 4.9° C.

It can be seen that the average temperature of the stator core 120, the average temperature of the permanent magnet, and the temperature of the first bearing 107 have decreased when the phase difference ΔD according to this embodiment is 0 mm, compared to the cases where the phase difference ΔD is 6 mm and 3 mm according to the comparative examples.

Embodiments disclosed herein provide a fan motor having structure that is capable of solving stagnation of air flow inside of a motor housing.

Embodiments disclosed herein further provide a fan motor having structure that is capable of sufficiently securing a cooling performance of a motor by securing a space for absorbing heat generated from the motor.

Embodiments disclosed herein furthermore provide a fan motor having structure that is capable of improving heat dissipation performance by increasing an area of a stator core, which is exposed to the outside of a motor housing.

Additionally, embodiments disclosed herein provide a fan motor having structure that is capable of effectively cooling the motor and also reducing a number of components and manufacturing costs by forming a reflux flow of air that moves from outside to inside of a motor housing without an additional component.

Embodiments disclosed herein provide a fan motor that may include a shroud; an impeller accommodated in the shroud and forming a flow of air; a rotational shaft to which the impeller is coupled; a motor housing coupled to a downstream side of the shroud; and a motor accommodated in the motor housing and driving the impeller by including a rotor coupled to the rotational shaft and a stator surrounding the rotor. The motor housing may include an outer wall part; an inner wall part disposed radially inside of the outer wall; and a vane disposed between an outer circumferential surface of the outer wall part and an outer circumferential surface of the inner wall part to guide the flow of the air.

A discharge passage may be defined between the inner wall part and an outer circumferential of the stator. Air in an air pocket, which is formed at the inner wall part of the motor housing, may be discharged to the outside of the motor housing through the discharge passage by a fast flow rate of air passed through the vane. With this structure, air in the air pocket may absorb heat generated from the motor and exhaust to the outside of the motor housing without stagnation, thereby improving a cooling performance of the motor.

The stator may include a stator core and a stator coil wound around the stator core. A gap of the discharge passage may be defined as a gap between an inner circumferential surface of the inner wall part and an outer circumferential surface of the stator core.

The gap of the discharge passage may be greater than or equal to a thickness of the inner wall part and smaller than or equal to a radial width of the vane. The radial width of the vane may be defined as a length of the vane extending in a radial direction from the inner circumferential surface of the outer wall part to the outer circumferential surface of the inner wall part. With this configuration, the gap of the discharge passage may narrow a flow path gap between the vane and the stator, so that the flow of air passing through the vane may hit the outer circumferential surface of the stator at high speed.

The gap of the discharge passage may be 3% to 11% of a diameter of the outer circumferential surface of the outer wall part or an outer diameter of the vane in the radial direction. If the gap of the discharge passage is smaller than a lowest value of a numerical range, flow resistance may increase, which may make it difficult for air to be discharged. If the gap of the discharge passages is larger than a highest value of the numerical range, a flow rate may decrease, which may cause a problem in that suction force for air in the air pocket is reduced.

A height of the air pocket may be defined as a gap between an inner surface of the cover part, which covers the upstream end of the inner wall, and an upstream end of the motor. The height of the air pocket may correspond to a length between the inner surface of the cover part and a downstream end of the vane. With this structure, the air pocket may secure a sufficient spatial volume to accommodate air to absorb heat generated from the motor. Additionally, the area of the motor exposed to the outside of the motor housing may increase, thereby improving a heat dissipation performance of the motor.

The height of the air pocket may be 22% to 42% of an outer diameter of the vane in the radial direction. If the height of the air pocket is smaller than a lowest value of the numerical range, a volume of the air pocket for accommodating air may be reduced, which may lower the cooling performance of the motor. If the height of the air pocket is greater than a highest value of the numerical range, the size (axial length) of the fan motor may increase, which may be disadvantageous in miniaturizing a product.

A phase difference may be defined as a value obtained by subtracting an axial spacing between an inner surface of the cover part and an upstream end of the stator from an axial distance between the inner surface of the cover part and a downstream end of the vane. A range of the phase difference may be $-h_p \leq$ phase difference$\leq +h_p$, where the $h_p$ may denote a protrusion height of an insulator boss portion. The insulator boss portion may protrude from an insulator, which covers an upstream end of the stator core, in the axial direction of the rotational shaft.

If the phase difference is smaller than $-h_p$, it may be disadvantageous in miniaturization of a product. If the phase difference is greater than $h_p$, an amount of air accommodated in the air pocket may decrease, thereby lowering the cooling performance of the motor.

A downstream end of the vane and an upstream end of the stator may be disposed to overlap each other in the radial direction. With this structure, an optimal structure for cooling the motor using air may be realized.

The stator core may include a plurality of teeth that protrudes radially from an inside of the stator core toward a center of the rotational shaft, and a plurality of slots that is formed between the plurality of teeth and around which the stator coil is wound. Air outside of the motor housing may form a reflux flow while moving from a downstream side of the motor toward the air pocket through the slots. This may increase an exposed area of the motor to be contactable with air without an addition of a component, thereby maximizing a heat dissipation performance of the motor. Additionally, heated air inside of the air pocket may be replaced with cool air outside of the motor housing by virtue of the reflux flow.

An axial distance between an inner surface of the cover part and a downstream end of the outer wall part may be equal to an axial distance between the inner surface of the cover part and a downstream end of the inner wall part. This may improve straightness of the flow of air passing through the vane. An axial distance between an inner surface of the cover part and a downstream end of the inner wall part may be shorter than an axial distance between the inner surface of the cover part and a downstream end of the outer wall part.

The vane may include a vane extension portion that extends radially from a downstream end of the vane to cover a thickness surface of the inner wall part. Optionally, the vane may further include a vane protrusion portion that protrudes from the vane extension portion to the discharge passage. With this structure, air that has passed through the vane may partially flow into the air pocket to cool the motor.

The vane may be configured as a one-stage vane or an N-stage vane (N is a natural number equal to or greater than 2) formed to be separated from each other in the flow direction of the air. This may facilitate manufacturing of the vane.

The motor housing may include a plurality of support portions that protrudes in a radial direction from an inner circumferential surface of the inner wall part to cover the outer circumferential surface of the stator and extend in the axial direction from a downstream end of the inner wall part, to support the stator. Accordingly, the plurality of support portions may stably support the motor.

The plurality of support portions may be spaced apart in a circumferential direction along the outer circumferential surface of the stator. The discharge passage may be disposed between the plurality of support portions adjacent to each other in the circumferential direction. With this structure, the discharge passage may improve accessibility of air passed through the vane to the outer circumferential surface of the stator.

A motor seating portion may be formed concavely on an inner surface of the support portion in the radial direction. The motor seating portion may align a seating position of the motor, which is spaced apart axially from an inner surface of the cover part. With this structure, the motor seating portion may display a seating starting point of the motor to facilitate seating of the motor.

The motor housing may include a first inner wall portion that has a first thickness and is formed in a cylindrical shape.

The motor housing may further include a second inner wall portion. The second inner wall portion may be connected to a downstream side of the first inner wall portion based on the flow direction of the air. The second inner wall portion may have a second thickness thicker than the first thickness and may be formed in a cylindrical shape.

The motor housing may further include a flow path inner wall portion surrounding the outer circumferential surface of the first inner wall portion. The motor housing may further include a flow path outer wall portion that is accommodated inside of a downstream end of the shroud and disposed outside of the flow path inner wall portion to be spaced radially apart from the flow path inner wall portion. The motor housing may further include an outer wall portion that is connected to a downstream end of the flow path outer wall portion and disposed outside of the second inner wall portion to be spaced radially apart from the second inner wall portion.

The motor housing may include a first vane that extends to protrude from an outer circumferential surface of the flow path inner wall portion to the flow path outer wall portion. The motor housing may include a second vane that is connected to communicate with a downstream end of the first vane and extends to protrude from an outer circumferential surface of the second inner wall portion to the outer wall portion. With this structure, the first vane and the second vane may be disposed at an upstream side and a downstream side, based on the flow direction of the air, to be separated from each other. This may facilitate manufacturing of the vane.

The outer wall portion may be coupled to a downstream end of the shroud. This may facilitate coupling between the shroud and the motor housing.

The motor housing may include a first bearing that is disposed on a downstream side of the impeller based on the flow direction of the air and supports an upstream side of the rotational shaft, and a first bearing housing that is disposed in a central portion of the cover part to accommodate the first bearing. The motor housing may further include a second bearing that is disposed on a downstream side of the motor based on the flow direction of the air and supports a downstream side of the rotational shaft; and a second bearing housing that accommodates the second bearing. This may stably support the rotational shaft.

The motor housing may further include a support portion that protrudes from an inner circumferential surface of the inner wall part toward the rotational shaft to support the outer circumferential surface of the stator; a coupling portion that is coupled to a downstream end of the support portion; and a bridge that extends in the radial direction to be connected to an outer circumferential surface of the second bearing housing and an inner circumferential surface of the coupling portion. With this structure, the coupling portion can connect the second bearing housing to the support portion.

The fan motor may further include a controller that is disposed on a downstream side of the motor and has a printed circuit board (PCB) with an IGBT and a capacitor mounted thereon to control an operation of the motor. A lead wire electrically connected to the stator may be connected to a power source connector disposed on the PCB. With this structure, power can be applied to the stator. The PCB may be disposed to face the air pocket in the axial direction. The air discharged from the air pocket through the discharge passage may move to the PCB to cool the IGBT and the capacitor.

Air between the downstream side of the motor and the PCB may form a reflux flow while moving toward the air pocket through an inner flow path formed inside the motor and moving to the air pocket. This may improve the cooling performance of the controller and the motor.

According to embodiments disclosed herein, at least the following advantages may be obtained.

First, a motor housing accommodating a motor may include an outer wall part, an inner wall part disposed inside of the outer wall part, and a vane disposed between the outer wall part and the inner wall part to guide the flow of air formed by the impeller. An air pocket may be formed inside of the motor housing. Air present in the air pocket may absorb heat generated from the motor. A discharge passage may be defined between the inner circumferential surface of the inner wall part and the outer circumferential surface of a stator constituting the motor. As a diameter of the inner wall portion of the vane decreases with respect to the outer circumferential surface of the stator, a gap of the discharge passage may be narrowed. Accordingly, air that has passed through the vane may hit the outer circumferential surface of the stator through the discharge passage. The flow rate of air moving in an axial direction along the outer circumferential surface of the stator may be faster than the flow rate of air in the air pocket. The high flow rate of air flowing along the outer circumferential surface of the stator may suction air from the air pocket and discharge it to the outside of the motor housing. This may allow the air inside of the air pocket to be discharged to outside without being stagnant.

Second, if the space of the air pocket is insufficient, an accommodation space for air that may absorb heat generated from the motor may be reduced, thereby lowering the cooling performance of the motor. In order to increase the cooling performance of the motor, securing space for the air pocket may be important. There are two ways to increase the space of the air pocket. One of these methods is to increase the radius of the air pocket. However, if the inner diameter of the inner wall part is increased to increase the radius of the air pocket, the gap of the discharge passage may be widened and the flow rate of air flowing along the outer circumferential surface of the stator may be lowered, making it difficult to discharge the air in the air pocket to the outside through the discharge passage. This may cause a limitation in increasing the radius of the air pocket.

Another method is to increase the height of the air pocket. The height of the air pocket refers to a distance between the upstream end of the motor and the inner surface of the motor housing. This may secure the space for the air pocket while reducing the gap of the discharge passage.

An optimal motor cooling structure may be achieved when the upstream end of the motor, which is axially spaced apart from the inner surface of the motor housing, corresponds to the length of a discharge portion of the vane that extends in the axial direction from the inner surface of the motor housing. For example, a phase difference may be defined as a value obtained by subtracting an axial spacing between the inner surface of the motor housing and the upstream end of the stator core from an axial distance between the inner surface of the motor housing and the downstream end of the vane. When the phase difference is 0 mm, an optimal motor cooling structure may be achieved. In order to improve the cooling performance of the motor, the phase difference may be within a protrusion height range corresponding to 0 mm±insulator boss portion. The insulator boss portion is a portion of the insulator that protrudes in the axial direction from the upstream end of the stator core to isolate (electrically insulate) the end portion of the stator coil from the surroundings.

Additionally, when the phase difference is 0 mm, an area of the stator core exposed to the outside of the motor housing may increase, thereby maximizing an effective cooling area of the motor. Further, external air of the motor housing may directly cool the outer circumferential surface of the stator core by the flow rate of air that has passed through the vane.

Third, air that has passed through the vane may increase the flow rate of an air layer around the stator core to suction air from the air pocket, forming a reflux flow that the external air of the motor housing is circulated back to the air pocket. With this structure, the reflux flow may eliminate the heat dome phenomenon caused by stagnation of air in the air pocket. Additionally, the reflux flow may effectively cool the motor by replacing heated air in the air pocket with cool air.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" may include any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fan motor, comprising:
a shroud;
an impeller that is accommodated in the shroud and generates a flow of air;
a rotational shaft to which the impeller is coupled;
a motor housing that is coupled to a downstream side of the shroud based on a flow direction of the air; and
a motor that is accommodated inside of the motor housing and drives the impeller, the motor including a rotor coupled to the rotational shaft and a stator that surrounds the rotor, wherein the motor housing comprises:
an outer wall;
an inner wall disposed radially inside of the outer wall;
a cover that covers an upstream end of the inner wall based on the flow direction of the air; and
at least one vane that is disposed between an inner circumferential surface of the outer wall and an outer circumferential surface of the inner wall, to guide the flow of the air, wherein a discharge passage is formed between the inner wall and an outer circumferential surface of the stator, wherein air in an air pocket, which is formed by the cover, the inner wall, and an upstream end of the motor, is discharged through the discharge passage by a flow rate of air flowing along the at least one vane, wherein a phase difference defined as a height difference between the at least one vane and the stator based on an inner surface of the cover is less than or equal to a protrusion height of an insulator boss portion, and wherein the insulator boss portion protrudes from an insulator, which covers an upstream end of a stator core of the stator, in an axial direction of the rotational shaft.

2. The fan motor of claim 1, wherein the stator comprises the stator core, and a stator coil wound around the stator core, wherein a gap of the discharge passage is defined as a gap between an inner circumferential surface of the inner wall and an outer circumferential surface of the stator core of the stator, wherein the gap of the discharge passage is greater than or equal to a thickness of the inner wall and smaller than or equal to a radial width of the at least one vane, and wherein the radial width of the at least one vane is defined as a length of the at least one vane extending in a radial direction from the inner circumferential surface of the outer wall to the outer circumferential surface of the inner wall.

3. The fan motor of claim 2, wherein the gap of the discharge passage is 3% to 11% of a diameter of an outer circumferential surface of the outer wall or an outer diameter of the at least one vane in the radial direction.

4. The fan motor of claim 2, wherein the phase difference is defined as a value obtained by subtracting an axial spacing between an inner surface of the cover and an upstream end of the stator from an axial distance between the inner surface of the cover and a downstream end of the at least one vane, wherein a range of the phase difference is $-h_p \leq$ phase difference $\leq +h_p$, wherein $h_p$ denotes the protrusion height of the insulator boss portion.

5. The fan motor of claim 2, wherein the stator core comprises:
a plurality of teeth that protrudes radially from an inside of the stator core toward a center of the rotational shaft; and
a plurality of slots formed between the plurality of teeth and around which the stator coil is wound, and wherein air outside of the motor housing forms a reflux flow while moving from a downstream side of the motor toward the air pocket through the plurality of slots.

6. The fan motor of claim 1, wherein a height of the air pocket is defined as a gap between the inner surface of the cover and an upstream end of the motor, and wherein the height of the air pocket corresponds to a length between inner surface of the cover and a downstream end of the at least one vane.

7. The fan motor of claim 6, wherein the height of the air pocket is 22% to 42% of an outer diameter of the at least one vane in a radial direction.

8. The fan motor of claim 1, wherein a downstream end of the at least one vane and an upstream end of the stator overlap each other in a radial direction.

9. The fan motor of claim 1, wherein an axial distance between the inner surface of the cover and a downstream end of the outer wall is equal to an axial distance between the inner surface of the cover and a downstream end of the inner wall.

10. The fan motor of claim 1, wherein an axial distance between the inner surface of the cover and a downstream end of the inner wall is shorter than an axial distance between the inner surface of the cover and a downstream end of the outer wall, and wherein the at least one vane comprises:
a vane extension portion that extends radially from a downstream end of the at least one vane to cover a thickness surface of the inner wall; and
a vane protrusion portion that protrudes from the vane extension portion to the discharge passage.

11. The fan motor of claim 1, wherein the at least one vane is configured as a one-stage vane or an N-stage vane, where N is a natural number greater than or equal to 2, formed to be separated from each other in the flow direction of the air.

12. The fan motor of claim 1, wherein the motor housing comprises a plurality of support portions that protrudes in a radial direction from an inner circumferential surface of the inner wall to cover the outer circumferential surface of the stator and extend in the axial direction from a downstream end of the inner wall, to support the stator, wherein the plurality of support portions is spaced apart in a circumferential direction along the outer circumferential surface of the stator, and wherein the discharge passage is disposed between the plurality of support portions adjacent to each other in a circumferential direction.

13. The fan motor of claim 12, wherein a motor seating portion is formed concavely on an inner surface of each of the plurality of support portions in the radial direction, and wherein the motor seating portion aligns a seating position of the motor, which is spaced apart axially from an inner surface of the cover.

14. The fan motor of claim 1, wherein the inner wall comprises:
  a first inner wall portion that has a first thickness and is formed in a cylindrical shape; and
  a second inner wall portion that is connected to a downstream side of the first inner wall portion based on the flow direction of the air, has a second thickness thicker than the first thickness, and is formed in a cylindrical shape, wherein a flow path inner wall portion surrounds an outer circumferential surface of the first inner wall portion, wherein a flow path outer wall portion is accommodated inside of a downstream end of the shroud and disposed outside of the flow path inner wall portion to be spaced radially apart from the flow path inner wall portion, wherein the outer wall is connected to a downstream end of the flow path outer wall portion and disposed outside of the second inner wall portion to be spaced radially apart from the second inner wall portion, and wherein the at least one vane comprises:
    a first vane that protrudes from an outer circumferential surface of the flow path inner wall portion to the flow path outer wall portion; and
    a second vane that is connected to communicate with a downstream end of the first vane and protrudes from an outer circumferential surface of the second inner wall portion to the outer wall.

15. The fan motor of claim 1, wherein the outer wall is coupled to a downstream end of the shroud.

16. The fan motor of claim 1, wherein the motor housing comprises:
  a first bearing that is disposed on a downstream side of the impeller based on the flow direction of the air and supports an upstream side of the rotational shaft; and
  a first bearing housing that is disposed at a central portion of the cover to accommodate the first bearing.

17. The fan motor of claim 16, wherein the motor housing further comprises:
  at least one support portion that protrudes from an inner circumferential surface of the inner wall toward the rotational shaft to support the outer circumferential surface of the stator;
  a second bearing that is disposed on a downstream side of the motor based on the flow direction of the air and supports a downstream side of the rotational shaft; and
  a second bearing housing that accommodates the second bearing;

a coupling portion that is coupled to a downstream end of the at least one support portion; and
  a bridge that extends in a radial direction to be connected to an outer circumferential surface of the second bearing housing and an inner circumferential surface of the coupling portion.

18. The fan motor of claim 1, further comprising a controller that is disposed on a downstream side of the motor and has a printed circuit board (PCB) with an insulated-gate bipolar transistor (IGBT) and a capacitor mounted thereon to control an operation of the motor, and wherein a lead wire electrically connected to the stator is connected to a power source connector disposed on the printed circuit board (PCB).

19. The fan motor of claim 18, wherein the printed circuit board (PCB) is disposed to face the air pocket in an axial direction, and wherein the air discharged from the air pocket through the discharge passage moves to the printed circuit board (PCB) to cool the insulated-gate bipolar transistor (IGBT) and the capacitor.

20. The fan motor of claim 18, wherein air between a downstream side of the motor and the printed circuit board (PCB) forms a reflux flow while moving toward the air pocket through an inner flow path formed inside of the motor and moving to the air pocket.

21. A fan motor, comprising:
  a shroud;
  an impeller that is accommodated in the shroud and generates a flow of air;
  a rotational shaft to which the impeller is coupled;
  a motor housing that is coupled to a downstream side of the shroud based on a flow direction of the air; and
  a motor that is accommodated inside of the motor housing and drives the impeller, the motor including a rotor coupled to the rotational shaft and a stator that surrounds the rotor, wherein the motor housing comprises:
    an outer wall;
    an inner wall disposed radially inside of the outer wall;
    a cover that covers an upstream end of the inner wall based on the flow direction of the air; and
    at least one vane that is disposed between an inner circumferential surface of the outer wall and an outer circumferential surface of the inner wall, to guide the flow of the air, wherein a discharge passage is formed between the inner wall and an outer circumferential surface of the stator, wherein air in an air pocket, which is formed by the cover, the inner wall, and an upstream end of the motor, is discharged through the discharge passage by a flow rate of air passed flowing along the at least one vane, wherein a gap of the discharge passage is defined as a gap between an inner circumferential surface of the inner wall and an outer circumferential surface of a stator core of the stator, wherein the gap of the discharge passage is greater than or equal to a thickness of the inner wall and smaller than or equal to a radial width of the at least one vane, wherein a phase difference defined as a height difference between the at least one vane and the stator based on an inner surface of the cover is less than or equal to a protrusion height of an insulator boss portion, and wherein the insulator boss portion protrudes from an insulator, which covers an upstream end of the stator core, in an axial direction of the rotational shaft.

* * * * *